(12) United States Patent
Ikeda

(10) Patent No.: US 10,402,133 B2
(45) Date of Patent: Sep. 3, 2019

(54) IMAGE DATA PROCESSING CONTROLLER, CONTROL METHOD AND STORAGE MEDIUM

(71) Applicant: Shoh Ikeda, Kanagawa (JP)

(72) Inventor: Shoh Ikeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/839,927

(22) Filed: Dec. 13, 2017

(65) Prior Publication Data

US 2018/0165048 A1 Jun. 14, 2018

(30) Foreign Application Priority Data

Dec. 13, 2016 (JP) .................................. 2016-241562
May 16, 2017 (JP) .................................. 2017-097518

(51) Int. Cl.
*G06F 3/12* (2006.01)
*H04N 1/00* (2006.01)

(52) U.S. Cl.
CPC .............. *G06F 3/1244* (2013.01); *G06F 3/12* (2013.01); *G06F 3/1206* (2013.01);
(Continued)

(58) Field of Classification Search
CPC ........... G06F 17/2258; G06F 17/30905; H04L 29/06; H04L 29/06027; H04L 47/10; H04L 65/4084; H04L 65/602; H04L 67/02; H04L 67/2823; H04L 67/2828; H04L 67/42; H04L 69/04; H04L 69/24; H04L 69/329
(Continued)

(56) References Cited

U.S. PATENT DOCUMENTS 5,764,325 A * 6/1998 Bryan-Brown ..... G02F 1/13378
349/123
2011/0299114 A1* 12/2011 Nishimaki ............ G06F 3/1213
358/1.15

(Continued)

FOREIGN PATENT DOCUMENTS

| JP | 2010-208304 | 9/2010 |
|---|---|---|
| JP | 2016-040740 | 3/2016 |
| JP | 2016-042388 | 3/2016 |

*Primary Examiner* — Negussie Worku
(74) *Attorney, Agent, or Firm* — Oblon, McClelland, Maier & Neustadt, L.L.P.

(57) ABSTRACT

An image data processing controller includes circuitry to receive, from a server, output target image information, and command information including a description of process setting information in a first format used for generating and outputting an image, set description conversion setting information to one or more specific job receiving units, convert, when the description of process setting information in the first format is not interpretable by the image data processing controller, the description of process setting information in the first format into the description of process setting information in a second format interpretable by the image data processing controller by referencing the set description conversion setting information, and generate image drawing information to be used by an image generator based on the output target image information, and the command information including the description of process setting information in at least one of the first and second format.

16 Claims, 27 Drawing Sheets

(52) U.S. Cl.
  CPC ............. *G06F 3/1285* (2013.01); *H04N 1/00* (2013.01); *H04N 1/0097* (2013.01); *H04N 1/00244* (2013.01)

(58) Field of Classification Search
  USPC ......... 358/1.15; 345/428, 1.15; 707/E17.121
  See application file for complete search history.

(56) References Cited

U.S. PATENT DOCUMENTS

| | | | |
|---|---|---|---|
| 2016/0260000 A1* | 9/2016 | Yamakawa | G06K 15/1867 |
| 2016/0275386 A1* | 9/2016 | Aoki | G06K 15/4015 |
| 2017/0024171 A1* | 1/2017 | Abe | G06F 3/1235 |
| 2017/0054869 A1* | 2/2017 | Sochi | H04N 1/32523 |
| 2017/0131956 A1* | 5/2017 | Kuroiwa | G06F 3/1285 |
| 2017/0132501 A1* | 5/2017 | Yamakawa | G06K 15/1802 |
| 2017/0242635 A1* | 8/2017 | Yamakawa | G06F 3/1247 |
| 2017/0255421 A1* | 9/2017 | Aoki | G06F 3/1205 |
| 2018/0314923 A1* | 11/2018 | Yamakawa | G06K 15/181 |
| 2018/0332186 A1* | 11/2018 | Miyaguchi | H04N 1/0097 |

* cited by examiner

FIG. 3

JDF INFORMATION

JOB INFORMATION
  NUMBER OF COPIES : XX COPIES
  NUMBER OF TOTAL PAGES : XX PAGES
  RIP CONTROL MODE : PAGE MODE
  CATALOG ID : XX

EDIT INFORMATION
  ORIENTATION INFORMATION : PORTRAIT
  PRINT FACE INFORMATION : DUPLEX
  ROTATION : 90 DEGREES
  ENLARGE/REDUCE : 125%
  IMAGE POSITION
    OFFSET : XX
    POSITION ADJUSTMENT INFORMATION : XX
  LAYOUT INFORMATION
    CUSTOM IMPOSITION ARRANGEMENT : XX
    NUMBER OF PAGES : 2 IN 1
    IMPOSITION INFORMATION : LEFT TO RIGHT
    PAGE SEQUENCE INFORMATION : XX
    CREEP POSITION INFORMATION : XX
  MARGIN INFORMATION : XX
  CROP MARK INFORMATION
    CENTER CROP MARK INFORMATION : XX
    CORNER CROP MARK : XX

FINISHING INFORMATION
  COLLATE INFORMATION : PAGE BY PAGE
  STAPLE/BINDING INFORMATION : STAPLE
  PUNCH INFORMATION : XX
  FOLDING INFORMATION : XX
  TRIMMING : XX
  OUTPUT-TRAY INFORMATION : TRAY XX
  INPUT-TRAY INFORMATION : TRAY XX
  COVER SHEET INFORMATION : XX
  . . .

RIP STATUS
  PRE-FLIGHT : NotYet
  NORMALIZE : NotYet
  FONT : NotYet
  LAYOUT : NotYet
  MARK : NotYet
  CMM : NotYet
  TRAPPING : NotYet
  CALIBRATION : NotYet
  SCREENING : NotYet
  . . .

RIP DEVICE DESIGNATION
  PRE-FLIGHT : HWF SERVER
  NORMALIZE : HWF SERVER
  FONT : DFE (ENGINE A)
  LAYOUT : DFE (ENGINE A)
  MARK : DFE (ENGINE A)
  CMM : DFE (ENGINE B)
  TRAPPING : DFE (ENGINE B)
  CALIBRATION : DFE (ENGINE B)
  SCREENING : DFE (ENGINE B)
  . . .

DEVICE DESIGNATION : DIGITAL PRINTER

FIG. 5

WORKFLOW INFORMATION
1) INPUT OF DATA
2) HWF SERVER (RIP)
3) PREVIEW
4) TRANSMISSION TO DFE
5) POST PROCESSING
. . .

FIG. 7

| JDF INFORMATION | JOB ATTRIBUTE IN DFE |
|---|---|
| A-AMOUNT | NUMBER OF COPIES |
| A-ROTATE | ROTATION |
| . . . | |

FIG. 8

```
RIP PARAMETER
 TYPE OF INPUT/OUTPUT DATA   : JDF, PDL
 DATA READING INFORMATION    : XXXX
 RIP CONTROL MODE            : PAGE MODE
       . . .

INPUT/OUTPUT IMAGE INFORMATION
   INFORMATION OF OUTPUT IMAGE

. . .

INFORMATION OF INPUT IMAGE

. . .

INFORMATION OF IMAGE PROCESSING

. . .

PDL INFORMATION
   DATA AREA              : XXXX
   SIZE INFORMATION       : XXXX
   DATA ARRANGEMENT       : XXXX

RIP ENGINE IDENTIFICATION INFORMATION   : ENGINE A
```

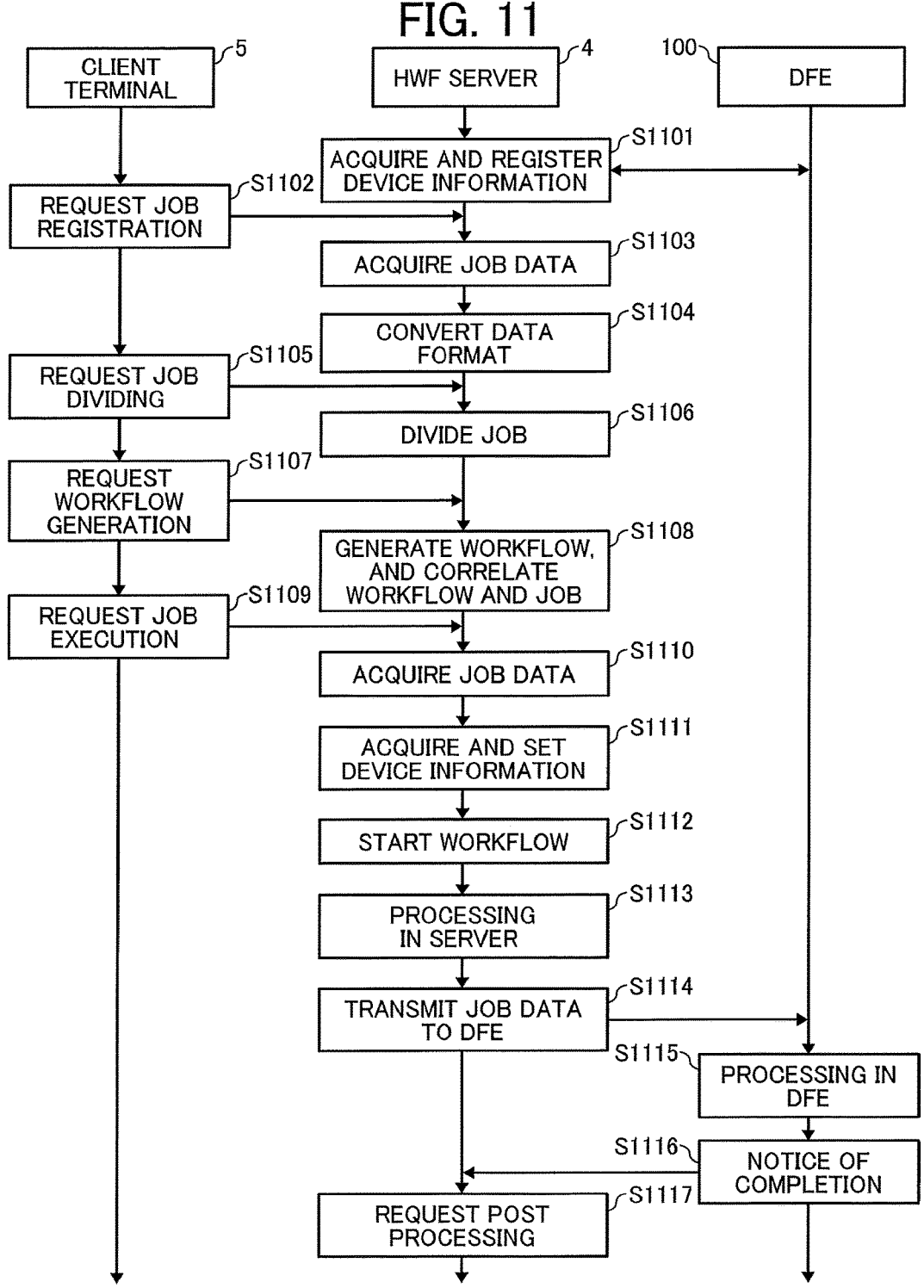

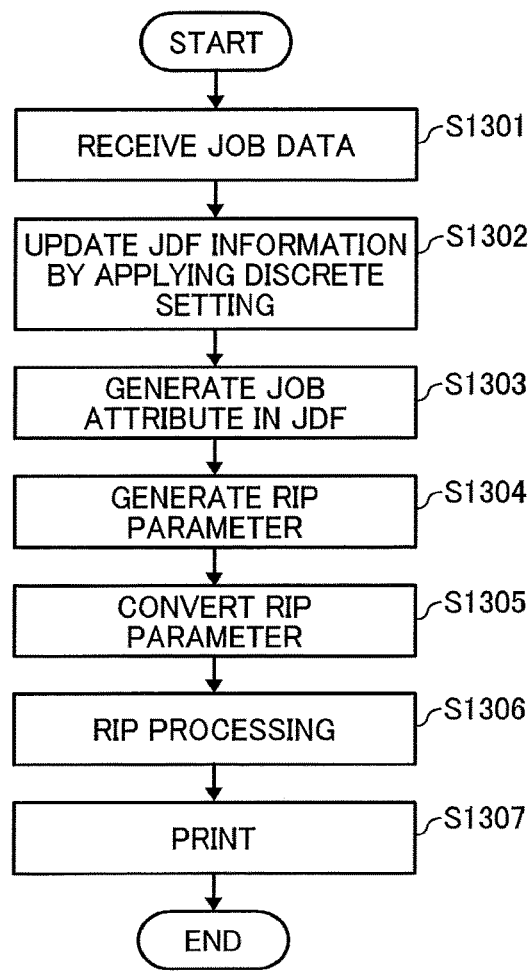

FIG. 19

```
<?xml version information = "1.0" character encode ="UTF-8"?>
<JDF>
   <pre-press element tag>
      <!--pre-press element -->
   </pre-press element tag>
   <press element tag>
      <!-- press element -->
   </press element tag>
   <post-press element tag >
      <!--post-press element       -->
   </post-press element tag>
</JDF>
```

FIG. 20

```
// extract press element from JDF of workflow software, and convert press
  element to JDF that can read by print controller
// open input JDF file // open output JDF file // extract press element from input JDF file
// write press element in output JDF file as element having name of "JDF"
```

FIG. 21

```
<?xml version information = "1.0" character encode ="UTF-8"?>
<JDF>
   <!- press element -->
</JDF>
```

FIG. 22

```
<?xml version information = "1. 0" character encode ="UTF-8"?>
<JDF>
   <resource pool tag>
      <sheet type ="A4 paper" Size = "595. 275  841. 889"/>
      <length after trimming = " 800.000"/>
   </resource pool tag>
</JDF>
```

FIG. 23

```
#include<fs>

// convert JDF of trimming setting of workflow software to JDF that can read
   by print controller
// open input JDF file // open output JDF file
// acquire sheet size after trimming from input JDF file
// acquire sheet size in Y direction before trimming
// calculate size of cut-portion by converting information // write size of cut-portion by converting information in output JDF file
```

FIG. 24

```
<?xml version information = "1. 0" character encode ="UTF-8"?>
<JDF>
   <resource pool tag>
      <sheet type ="A4 paper"  Size = "595. 275  841. 889"/>
      <length cut by trimming  = " 41.889"/>
   </resource pool tag>
</JDF>
```

FIG. 28

```
<?xml version information = "1.0" character encode ="UTF-8"?>
<JDF>
   <resource pool tag>
      <sheet type ="A4 plain paper" sheet feed tray = "auto"/>
   </resource pool tag>
</JDF>
```

FIG. 29

```
// convert JDF of sheet feed tray setting of workflow software to JDF that can read
   by print controller
// open input JDF file
// open output JDF file // acquire sheet feed tray setting from input JDF file // when sheet feed tray setting is auto
// search tray matched to condition from sheet feed tray setting of printer engine // acquire sheet type
         // search sheet feed tray number based on sheet type
// write sheet feed tray setting in output JDF file
```

FIG. 30

```
<?xml version information = "1.0" character encode ="UTF-8"?>
<JDF>
   <resource pool tag>
      <sheet type ="A4 plain paper" sheet feed tray = "tray 7"/>
   </resource pool tag>
</JDF>
```

FIG. 31

```
<?xml version information = "1. 0" character encode ="UTF-8"?>
<JDF>
    <resource pool tag>
        <color toner save mode = "execute" />
    </resource pool tag>
</JDF>
```

FIG. 32

```
// convert JDF of toner setting of workflow software to JDF that can read
   by print controller
// open input JDF file
// open output JDF file // acquire toner setting from input JDF file
   // write toner setting for each color in output JDF file
```

FIG. 33

```
<?xml version information = "1. 0" character encode ="UTF-8"?>
<JDF>
    <resource pool tag>
      <color>
        <Cyan    toner save mode = " execute " />
        <Magenta toner save mode = " execute " />
        <Yellow  toner save mode = " execute " />
        <Black   toner save mode = " execute " />
      </color>
    </resource pool tag>
<JDF>
```

FIG. 34

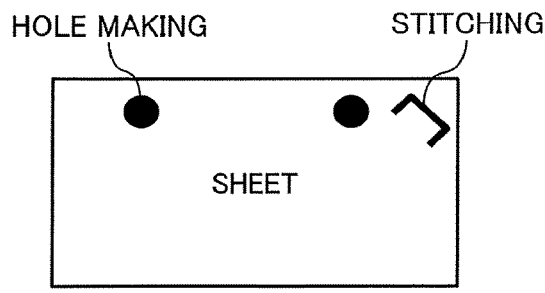

FIG. 35

```
<?xml version information = "1. 0" character encode ="UTF-8"?>
<JDF>
    <resource pool tag>
        <punching: first process>
        <stapling: second process>
    </resource pool tag>
</JDF>
```

FIG. 36

```
// convert JDF of process sequence of workflow software to JDF that can read
   by print controller
// open input JDF file
// open output JDF file
// acquire process sequence of punching from input JDF file
// acquire process sequence of stapling from input JDF file
// when punching is set before stapling, change process sequence
// write process sequence in output JDF file
```

FIG. 37

```
<?xml version information = "1. 0" character encode ="UTF-8"?>
<JDF>
    <resource pool tag>
        <punching: second process>
        <stapling: first process>
    </resource pool tag>
</JDF>
```

FIG. 38

```
<?xml version information = "1. 0" character encode ="UTF-8"?>
<JDF>
    <resource pool tag>
        <sheet ejection location = " finish tray" />
    </resource pool tag>
</JDF>
```

FIG. 39

```
// convert JDF of definition position of element of workflow software to JDF that
   can read by print controller
// open input JDF file
// open output JDF file
// acquire sheet ejection tray setting from input JDF file
// write sheet ejection tray setting in output JDF
```

FIG. 40

```
<?xml version information = "1. 0" character encode ="UTF-8"?>
<JDF>
   <resource pool tag>
      <sheet ejection tag>
         <sheet ejection location = "finish tray"/>
      </sheet ejection tag>
   </resource pool tag>
</JDF>
```

FIG. 41

```
<?xml version information = "1. 0" character encode ="UTF-8"?>
<JDF>
   <resource pool tag>
      <!-JDF information -->
</JDF>
```

FIG. 42

```
// add element not included in JDF of workflow software so that print controller
   can read element
// open input JDF file
// open output JDF file
// when JDF version is not included in input JDF file, add version information
```

FIG. 43

```
<?xml version information = "1. 0" character encode ="UTF-8"?>
<JDF: JDF of version 1.4>
   <!-JDF information -->
</JDF>
```

FIG. 44

```
<?xml version information = "1. 0" character encode ="UTF-8"?>
<JDF>
   <sheet type = "A3 plain paper"/>
   <punching />
</JDF>
```

FIG. 45

```
// when combination of elements not supported by print controller is included in JDF,
   delete unsupported element
// open input JDF file
// open output JDF file
// when A3 sheet is used, punching is not supported, thus delete punching
```

FIG. 46

```
<?xml version information = "1. 0" character encode ="UTF-8"?>
<JDF>
   <sheet type = "A3 plain paper"/>
</JDF>
```

FIG. 48

```
<?xml version information = "1. 0" character encode ="UTF-8"?>
<JDF>
    <resource pool tag>
        <file information URL is "http://xx.xx.xx.xx:xxxx/PDF1.pdf"/>
    </resource pool tag>
</JDF>
```

FIG. 49

```
acquire print target file
{
  //acquire URL from input JDF file

//access URL acquired by using access key and enable acquiring of
    print target file and file name by using password
    acquire print target file and file name //change URL in output JDF file to file name
}
```

FIG. 50

```
<?xml version information = "1. 0" character encode ="UTF-8"?>
<JDF>
    <resource pool tag>
        <file information URL is " PDF1. pdf "/>
    </resource pool tag>
</JDF>
```

FIG. 51

```
<?xml version information = "1. 0" character encode ="Shift-JIS"?>
<JDF: name is "A RO HA"/>
```

```
convert character encoding
{
    //acquire character encoding of input JDF file //acquire character code table of input character encoding and
      character code table of UTF - 8

//convert JDF character encoding based on character code tables of
      each character encoding
}
```

```
<?xml version information = "1. 0" character encode ="UTF-8"?>
<JDF: name is "A RO HA"/>
```

FIG. 55

| | Paper 1 | Paper 2 |
|---|---|---|
| SHEET ATTRIBUTE | SIZE: A4<br>SHEET TYPE: PLAIN PAPER<br>BASIS WEIGH: 80g/m² <br>COLOR: WHITE | SIZE: A4<br>SHEET TYPE: GLOSSY PAPER<br>BASIS WEIGH: 100g/m²<br>COLOR: WHITE |

FIG. 56

```
<?xml version information = "1. 0" character encode ="UTF-8"?>
<JDF>
   <resource pool tag>
      <sheet size is "A4"  basis weigh is " 80g/m²"/>
   </resource pool tag>
</JDF>
```

FIG. 57

```
search suitable sheet
{
   //acquire sheet information from input JDF file
   //acquire candidate list of sheet that satisfies condition from
      sheet list in DEF
   //select sheet from candidate list of sheet
   //set sheet type in output JDF file
}
```

FIG. 58

```
<?xml version information = "1. 0" character encode ="UTF-8"?>
<JDF>
   <resource pool tag>
      <sheet type is "Paper 1"/>
   </resource pool tag>
</JDF>
```

FIG. 59

```
<?xml version information = "1. 0" character encode ="UTF-8"?>
<JDF>
   <resource pool tag>
      <client information   contact information is "050-XXXX-XXXX"
                            contact method is  "Phone"
                            name is "AAAA BBBB"
                            remarks "Some messages"/>
   </resource pool tag>
</JDF>
```

FIG. 60

```
classify client information
{
   //acquire client information
   //change entire client information to "x"
   //write in output JDF file
}
```

FIG. 61

```
<?xml version information = "1. 0" character encode ="UTF-8"?>
<JDF>
   <resource pool tag>
      <client information   contact information is "xxx-xxxx-xxxx"
                            contact method is  "xxxxx"
                            name is "xxxx xxxxx"
                            remarks "xxxx xxxxxxxx"/>
   </resource pool tag>
</JDF>
```

IMAGE DATA PROCESSING CONTROLLER, CONTROL METHOD AND STORAGE MEDIUM

CROSS-REFERENCE TO RELATED APPLICATION

This application claims priority pursuant to 35 U.S.C. § 119(a) to Japanese Patent Application Nos. 2016-241562, filed on Dec. 13, 2016, and 2017-097518, filed on May 16, 2017 in the Japan Patent Office, the disclosure of which is incorporated by reference herein in its entirety.

BACKGROUND

Technical Field

This disclosure relates to an image data processing controller, a control method, and a storage medium.

Background Art

Processing relating to generation of print products can be controlled by using information transmission formats such as job definition format (JDF) and job messaging format (JMF) that defines the processing related to the generation of print products. This method can control operations in a system using different types of printers such as an offset printer and a digital printer by managing processing related to printing operation using different printers. This system is referred to as a hybrid work flow (HWF) system, and a server that controls the HWF system is referred to as a HWF server.

In general, the HWF system employs a standard specification of the information transmission format used in commercial printing industry such as JDF information. However, when system users want to add unique functions to the HWF system to enhance convenience of the printing operation, extended JDF information extended from the standard specification may be used. The extended JDF information can be created by, for example, changing description of standard JDF information or using a different character string.

Therefore, when a print job defined by the extended JDF information uniquely created by a vendor is input to a print controller used in the HWF system, the print controller cannot execute processing matched to a user intention because the description of the extended JDF information is different from the description of standard JDF interpretable by the print controller.

SUMMARY

As one aspect of the present invention, an image data processing controller communicable with a server for controlling a plurality of processes is devised. The image data processing controller includes circuitry to receive, from the server, output target image information, and command information including a description of process setting information in a first format defining a plurality of items used for generating and outputting an image, set description conversion setting information to one or more specific job receiving units implemented in the circuitry, each of the specific job receiving units set with the corresponding description conversion setting information, convert, when the description of process setting information in the first format is not interpretable by the image data processing controller, the description of process setting information in the first format into the description of process setting information in a second format interpretable by the image data processing controller by referencing the set description conversion setting information, and generate image drawing information to be used by an image generator based on the output target image information, and the command information including the description of process setting information in at least one of the first format and the second format.

As another aspect of the present invention, a method of controlling an image data processing controller communicable with a server for controlling a plurality of processes is devised. The method includes receiving, from the server, output target image information, and command information including a description of process setting information in a first format defining a plurality of items used for generating and outputting an image, setting description conversion setting information to one or more specific job receiving units implemented in the image data processing controller, each of the specific job receiving units set with the corresponding description conversion setting information, converting, when the description of process setting information in the first format is not interpretable by the image data processing controller, the description of process setting information in the first format into the description of process setting information in a second format interpretable by the image data processing controller by referencing the set description conversion setting information, and generating image drawing information to be used by an image generator based on the output target image information, and the command information including the description of process setting information in at least one of the first format and the second format.

As another aspect of the present invention, a non-transitory storage medium storing one or more instructions that, when executed by one or more processors, cause the one or more processors to execute a method of controlling an image data processing controller communicable with a server for controlling a plurality of processes is devised. The method includes receiving, from the server, output target image information, and command information including a description of process setting information in a first format defining a plurality of items used for generating and outputting an image, setting description conversion setting information to one or more specific job receiving units implemented in the image data processing controller, each of the specific job receiving units set with the corresponding description conversion setting information, converting, when the description of process setting information in the first format is not interpretable by the image data processing controller, the description of process setting information in the first format into the description of process setting information in a second format interpretable by the image data processing controller by referencing the set description conversion setting information, and generating image drawing information to be used by an image generator based on the output target image information, and the command information including the description of process setting information in at least one of the first format and the second format.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 3 is an example of JDF information of an embodiment of the present invention;

FIG. 5 is an example of workflow information of an embodiment of the present invention;

FIG. 7 is an example of a conversion table of an embodiment of the present invention;

FIG. 8 is an example of RIP parameter of an embodiment of the present invention;

FIG. 11 is a sequential chart for an operation flow of a HWF system of an embodiment of the present invention;

FIG. 12 illustrates an example of a dividing pattern of image data of an embodiment of the present invention;

FIG. 13 is a flowchart illustrating the steps of processing in a DFE of an embodiment of the present invention;

FIG. 19 is an example of JDF information included in job data input to a DFE of an embodiment of the present invention;

FIG. 20 is an example of a configuration of a JDF description conversion program of an embodiment of the present invention;

FIG. 21 is an example of JDF information description after conversion of an embodiment of the present invention;

FIG. 22 is another example of JDF information included in job data input to a DFE of an embodiment of the present invention;

FIG. 23 is another example of a configuration of a JDF description conversion program of an embodiment of the present invention;

FIG. 24 is another example of JDF information description after conversion of an embodiment of the present invention;

FIG. 28 is another example of JDF information included in job data input to a DFE of an embodiment of the present invention;

FIG. 29 is another example of a configuration of a JDF description conversion program of an embodiment of the present invention;

FIG. 30 is another example of JDF information description after conversion of an embodiment of the present invention;

FIG. 31 is another example of JDF information included in job data input to a DFE of an embodiment of the present invention;

FIG. 32 is another example of a configuration of a JDF description conversion program of an embodiment of the present invention;

FIG. 33 is another example of JDF information description after conversion of an embodiment of the present invention;

FIG. 34 illustrates a scheme of executing a punching process and a stapling process of an embodiment of the present invention;

FIG. 35 is another example of JDF information included in job data input to a DFE of an embodiment of the present invention;

FIG. 36 is another example of a configuration of a JDF description conversion program of an embodiment of the present invention;

FIG. 37 is another example of JDF information description after conversion of an embodiment of the present invention;

FIG. 38 is another example of JDF information included in job data input to a DFE of an embodiment of the present invention;

FIG. 39 is another example of a configuration of a JDF description conversion program of an embodiment of the present invention;

FIG. 40 is another example of JDF information description after conversion of an embodiment of the present invention;

FIG. 41 is another example of JDF information included in job data input to a DFE of an embodiment of the present invention;

FIG. 42 is another example of a configuration of a JDF description conversion program of an embodiment of the present invention;

FIG. 43 is another example of JDF information description after conversion of an embodiment of the present invention;

FIG. 44 is another example of JDF information included in job data input to a DFE of an embodiment of the present invention;

FIG. 45 is another example of a configuration of a JDF description conversion program of an embodiment of the present invention;

FIG. 46 is another example of JDF information description after conversion of an embodiment of the present invention;

FIG. 48 is another example of JDF information included in job data input to a DFE of an embodiment of the present invention;

FIG. 49 is another example of a configuration of a JDF description conversion program of an embodiment of the present invention;

FIG. 50 is another example of JDF information description after conversion of an embodiment of the present invention;

FIG. 51 is another example of JDF information included in job data input to a DFE of an embodiment of the present invention;

FIG. 55 illustrates an example of attribute information indicating attribute of recoding medium of an embodiment of the present invention;

FIG. 56 is another example of JDF information included in job data input to a DFE of an embodiment of the present invention;

FIG. 57 is another example of a configuration of a JDF description conversion program of an embodiment of the present invention;

FIG. 58 is another example of JDF information description after conversion of an embodiment of the present invention;

FIG. 59 is another example of JDF information included in job data input to a DFE of an embodiment of the present invention;

FIG. 60 is another example of a configuration of a JDF description conversion program of an embodiment of the present invention; and FIG. 61 is another example of JDF information description after conversion of an embodiment of the present invention.

Figure 1:
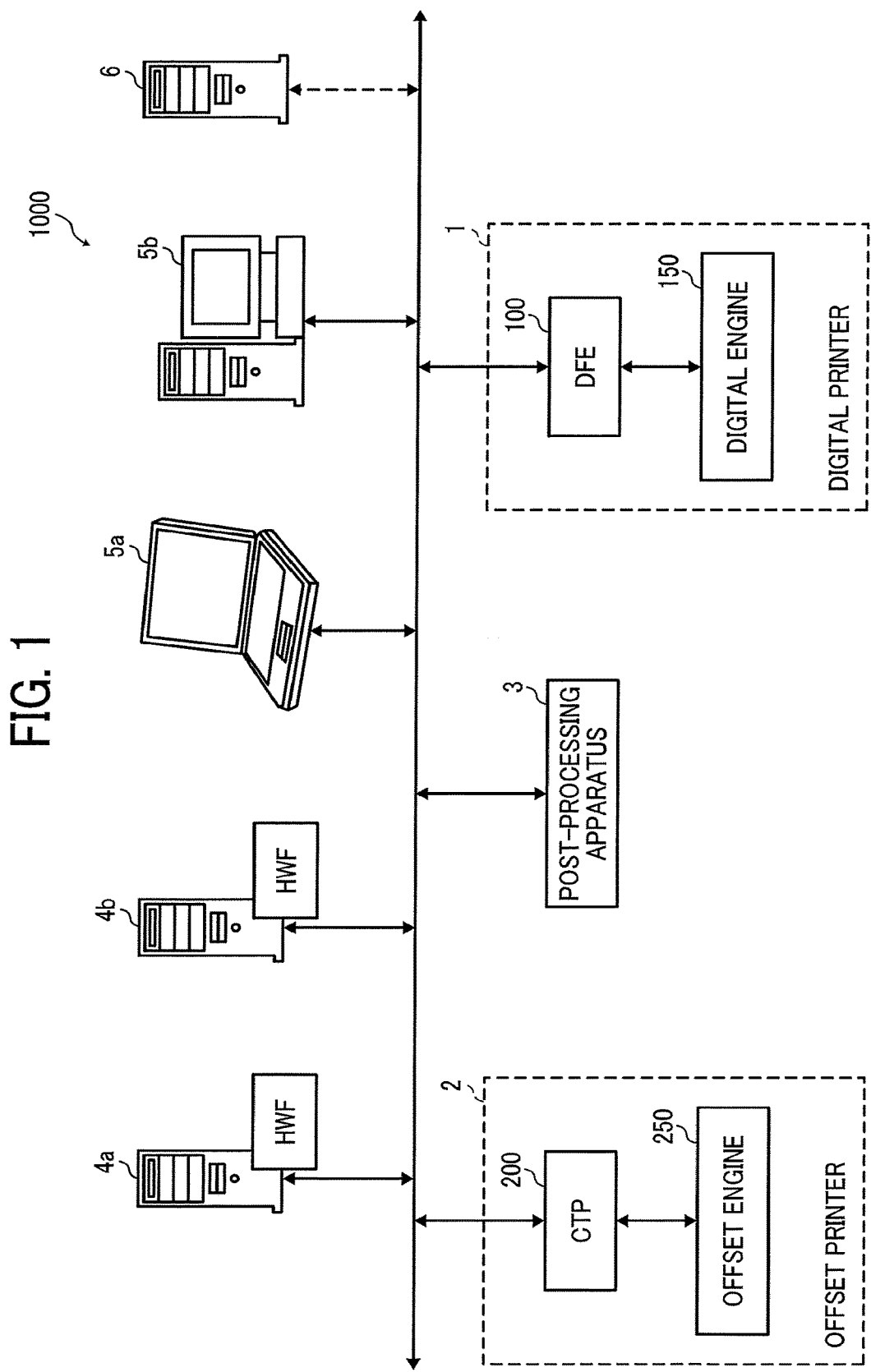
FIG. 1 is a schematic configuration of a HWF system of an embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

A description is given of an image processing system of an embodiment of the present invention with reference to drawings. The image processing system includes, for example, an offset printer, a digital printer, and a server, in which both of the offset printer and the digital printer can be controlled by the same server. Hereinafter, this image processing system is referred to as a hybrid work flow (HWF) system. In the HWF system, a raster image processor (RIP) engine disposed in a digital front end (DFE) that controls the digital printer, and a raster image processor (RIP) engine disposed in the HWF server can employ the same type of RIP engine, and the digital printer executes a printing operation in this HWF system under the condition that the same type of RIP engine is disposed at the different apparatuses configuring the HWF system. In this disclosure, the same type of RIP engine may mean two or more RIP engines have substantially same processing capabilities, and thereby the two or more RIP engines are not required to have the exact same processing capabilities.

FIG. 1 is a schematic configuration of a HWF system 1000 of an embodiment of the present invention. As illustrated in FIG. 1, the HWF system 1000 includes, for example, a digital printer 1, an offset printer 2, a post-processing apparatus 3, HWF servers 4a and 4b (hereinafter, collectively referred to HWF server 4 as required), and client terminals 5a and 5b (hereinafter, collectively referred to client terminal 5 as required) connectable with one to another via a network. In this description, the offset printer 2 is used as a first image forming apparatus, and the digital printer 1 is used as a second image forming apparatus.

The HWF system 1000 can be configured to further include a server 6 that stores image data, in which the digital printer 1 and the offset printer 2 can acquire image data from the server 6 by communicating with the server 6 via a network, and execute a print output operation based on the acquired image data. The server 6 can be used as a source of data and information, and thereby the server 6 can be referred to as a source, a data source or an information source.

The digital printer 1 is an example of printers that can generate and output images using an electrophotography method or an inkjet method without using a plate. The digital printer 1 includes, for example, a digital front end (DFE) 100, and a digital engine 150 as indicated in FIG. 1. The DFE 100 can be used as a controller for controlling an image generation and output, which means the DFE 100 can be used as an image data processing controller, an image generation-output controller, or an image generation-output output control apparatus, in which the DFE 100 controls the digital engine 150 to perform a print output operation or printing operation. Further, the digital engine 150 can be used as a device for generating an image, which may be referred to as an image generator or print engine. Therefore, the DFE 100 includes a raster image processor (RIP) engine that generates raster data that is referred or used by the digital engine 150 when performing the print output operation. The raster data is an example of drawing information or image drawing information.

The offset printer 2 is an example of printers that can generate and output images by using a plate. The offset printer 2 includes, for example, a computer-to-plate (CTP) 200, and an offset engine 250. The CTP 200 generates a plate based on the raster data. The offset engine 250 can perform an offset printing by using the plate generated by the CTP 200.

The post-processing apparatus 3 can perform various post-processing such as punching, stapling, and bookbinding to printed sheets output from the digital printer 1 and/or the offset printer 2.

The HWF server 4 is a server installed with an HWF software program that is used to manage an image processing operation such as inputting of job data including target image data of a print output operation, processing of the print output operation, and post-processing, in which the job data is used as a command information. The HWF server 4 controls the above mentioned various processing using information generated by using a job definition format (JDF) using extensible markup language (XML), which is referred to as "JDF information," The HWF server 4 can be used as a process execution control apparatus or a processing control apparatus.

The HWF server 4 further includes a raster image processor (RIP) engine 420. When the offset printer 2 performs an offset printing operation (i.e., print output operation), the RIP engine 420 disposed in the HWF server 4 generates raster data, and transmits the generated raster data to the CTP 200, in which the RIP engine 420 generates the raster data as first image drawing information used in the offset printer 2.

Further, when the digital printer 1 performs a printing operation (i.e., print output operation), the HWF server 4 transmits data to the DFE 100. Since the DFE 100 has the RIP engine 120 as described above, the digital printer 1 can perform the print output operation even when the HWF server 4 transmits print data that is not processed by the RIP processing in the HWF server 4 to the DFE 100.

As to the HWF system 1000, the same print data may be used for the print output operation by the digital printer 1 and the print output operation by the offset printer 2. For example, one book can be printed by the print output operation of the digital printer 1 and the print output operation by the offset printer 2, in which the print output operation by the digital printer 1 and the print output operation by the offset printer 2 are performed independently. In this configuration, if the print output by the digital printer 1 and the print output by the offset printer 2 differ in various aspects such as font and color, a user feels oddness on a printed product. Therefore, it is preferable that the print output operation result by the digital printer 1 and the print output operation result by the offset printer 2 become substantially the same one.

The differences in print output caused by using different devices or apparatuses may occur due to the RIP processing. Therefore, by using the same RIP engine for data or information processing at the digital printer 1 and data or information processing at the offset printer 2, the differences between the print output operation result by the digital printer 1 and the print output operation result by the offset printer 2 can be reduced or minimized.

Specifically, the RIP engine disposed in the HWF server 4 is an engine that can process data or information for both of the digital printer 1 and the offset printer 2, and the RIP engine disposed in the HWF server 4 can perform common processes for the digital printer 1 and the offset printer 2. Further, the RIP engine disposed in the DFE 100 and the RIP engine disposed in the HWF server 4 employ the same type of RIP engine, which means that the RIP engine disposed in the DFE 100 is compatible with the RIP engine disposed in the HWF server 4.

With this configuration, the HWF server 4 and the DFE 100 are disposed with the same RIP engine having the substantially same processing capability. Therefore, when the print output operation by the digital printer 1 is to be performed, the RIP processing by the HWF server 4 and the RIP processing by the DFE 100 can be selectively combined and performed.

An operator of the HWF system 1000 can operate the HWF server 4 by using the client terminal 5, in which the client terminal 5 can be used as an information processing terminal. The client terminal 5 can be any terminal devices or apparatuses such as a general personal computer (PC), but not limited hereto. The operator operates the client terminal 5 to display a graphic user interface (GUI) used for operating the HWF server 4, in which the GUI can be used to input data and setting the JDF information. The JDF information sets information for processing in the HWF system 1000, and the JDF information may be referred to as process setting information.

The server 6 is an information processing apparatus including a storage unit such as a memory that stores image data to be printed by using the HWF system 1000. The HWF server 4 acquires the image data stored in the server 6, and instructs the digital printer 1 and/or the offset printer 2 to execute a print output operation based on the image data, and/or the DFE 100 acquires the image data stored in the server 6, and instructs the digital printer 1 to execute a print output operation based on the image data.

Figure 2:
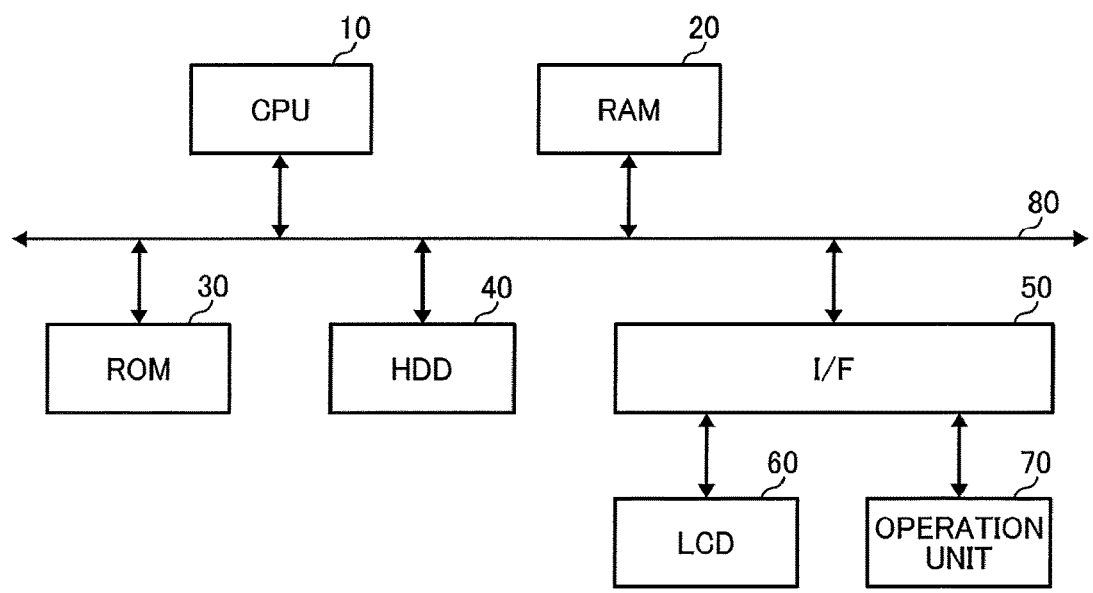
FIG. 2 illustrates an example of a hardware block diagram of an information processing apparatus of an embodiment of the present invention.

A description is given of a hardware configuration of the DFE 100, the HWF server 4, the client terminal 5, and the server 6 used as information processing apparatuses with reference to FIG. 2. As illustrated in FIG. 2, the information processing apparatus has a configuration similar to general servers and personal computers (PC).

Specifically, the information processing apparatus includes, for example, a central processing unit (CPU) 10, a random access memory (RAM) 20, a read only memory (ROM) 30, a hard disk drive (HDD) 40, and an interface (I/F) 50 that are connectable by a bus 80. Further, a liquid crystal display (LCD) 60 and an operation unit 70 are connectable to the interface I/F 50.

The CPU 10 is a computing unit such as circuitry that controls the entire operations of the information processing apparatus. Further the CPU 10 is a computing unit including one or more processors or circuits. The RAM 20 is a volatile memory, to which information can be read and written with high speed, and the CPU 10 uses the RAM 20 as a working area when processing information or data. The ROM 30 is a non-volatile memory used as a read only memory, in which various programs such as firmware are stored. The HDD 40 is a non-volatile memory, to which information can be read and written. For example, the HDD 40 stores an operating system (OS), various control programs, and application programs.

The I/F 50 is connected to the bus 80, various units and networks, and controls the connection. The LCD 60 is a user interface that a user can check the status of the information processing apparatus visually. The operation unit 70 is a user interface such as a key board and a mouse that a user can input information to the information processing apparatus. Since each of the HWF server 4 and the server 6 is used as the server, a user interface such as LCD 60 and operation unit 70 can be omitted for the HWF server 4 and the server 6.

As to the above described hardware configuration of the information processing apparatus, the CPU 10 performs computing by loading programs stored in the ROM 30, the HDD 40, and/or an external memory such as an optical disk on the RAM 20. With a combination of the software and the hardware, functional blocks required for the DFE 100, the HWF server 4, the client terminal 5, and the server 6 can be implemented.

A description is given of the JDF information with reference to FIG. 3. FIG. 3 is an example of the JDF information. As illustrated in FIG. 3, the JDF information includes, for example, "job information" related to a job execution, "edit information" related to the raster data, and "finishing information" related to the post-processing. Further, the JDF information includes, for example, information of "RIP status," "RIP device designation," and "device designation."

As illustrated in FIG. 3, the "job information" includes information of, for example, "number of copies," "number of total pages," "RIP control mode," and "catalog ID." The "number of copies" is information that designates the number of copies of an output target data to be output as a printed product. The "number of total pages" is information that designates the number of total pages included in one printed product. The "RIP control mode" indicates a control mode of the RIP processing, in which a "page mode" and a "sheet mode" can be designated for the "RIP control mode." The "catalog ID" is information that designates attribute of sheet to be described later in detail.

The "edit information" includes, for example, "orientation information," "print face information," "rotation," "enlarge/reduce," "image position," "layout information," "margin information," and "crop mark information." The "orientation information" is information that designates a printing orientation of a sheet such as "portrait (vertical)" and "landscape (horizontal)." The "print face information" is information that designates a to-be-printed face such as "duplex" and "one face."

The "rotation" is information that designates a rotation angle of an image of an output target data. The "enlarge/reduce" is information that designates a scale ratio of an image of an output target data. As to the "image position," "offset" is information that designates an offset of an image of an output target data, and "position adjustment information" is information that designates a position adjustment value of an image of an output target data.

The "layout information" includes, for example, "custom imposition arrangement," "number of pages," "page sequence information," and "creep position information." The "custom imposition arrangement" is information that designates an arrangement on a custom face. The "number of pages" is information that designates the number of pages printed in one sheet. For example, when images of two pages are condensed and printed on one face of a single sheet, information of "2 in 1" is designated. The "page sequence information" is information that designates a sequence of pages to be printed. The "creep position information" is information that designates a value related to an adjustment of a creep position.

The "margin information" is information that designates a value related to a margin such as a fit box and a gutter. The "crop mark information" includes, for example, "center crop mark information" and "corner crop mark information." The "center crop mark information" is information that designates a value related to a center crop mark. The "corner crop mark information" is information that designates a value related to a corner crop mark.

The "finishing information" includes, for example, "Collate information," "staple/binding information," "punch information," "folding information," "trimming," "output tray information," "input tray information," and "cover sheet information." The "Collate information" is information that designates a page-by-page printing or a document-by-document printing when one document is to be printed with a plurality of numbers of copies.

The "staple/binding information" is information that designates a process related to staple/binding. The "punch information" is information that designates a process related to punch. The "folding information" is information that designates a process related to folding of sheets. The "trimming" is information that designates a process related to trimming of sheets.

The "output tray information" is information that designates an output tray. The "input tray information" is information that designates an input tray. The "cover sheet information" is information that designates a process related to a cover sheet.

The "RIP status" is used as execution status information indicating whether each of internal processes included in the RIP processing is already executed. In an example case of FIG. 3, the internal processes of RIP processing includes image processing items such as "pre-flight," "normalize," "font," "layout," "mark," "CMM," "Trapping," "Calibration," and "Screening," and a processing status is set for each of the internal processes of RIP. In the example case of FIG. 3, the processing status of "NotYet" is set for the "RIP status" to indicate that "a concerned process is not yet processed". When each of the internal processes of RIP is executed, the status is updated to "Done" to indicate that "the concerned process is already processed."

The "RIP device designation" is information that designates a device to perform each of the internal processes of RIP processing. In the example case of FIG. 3, the "RIP device designation" designates which RIP device in the HWF server 4 or the DFE 100 performs each of the internal processes of RIP processing. As illustrated in FIG. 3, each one of the internal processes of RIP processing, corresponding to the "RIP status," is performed by setting any one of the "HWF server" and "DFE" for each of the internal processes of RIP processing. Further, when the "DFE" is set, information designating any one of a plurality of RIP engines installed in the DFE 100 can be designated from a plurality of RIP engines 120 installed in the DFE 100 or a module that executes processing for generating raster data such as "DFE (engine A)," "DFE (engine B)" and DFE (external processing unit 121).

The "device designation" is information that designates a device that executes a print job. In the example case of FIG. 3, the "digital printer" is designated to execute the print job. Further, the JDF information can include various information other than information illustrated in FIG. 3, which will described later in this disclosure.

The JDF information illustrated in FIG. 3 can be generated by an operator. For example, the operator operates the client terminal 5 to display a GUI of the HWF server 4, and then the operator sets various image processing items of the JDF information by using the GUI. The RIP engine disposed in the HWF server 4 and the RIP engine disposed in the DFE 100 can perform the RIP processing based on the JDF information. Further, the post-processing apparatus 3 can perform the post-processing based on the JDF information.

Further, when job data is input to the HWF server 4 from an external system or software, the job data assigned with JDF information may be input to the HWF server 4. The processing of job data assigned with JDF information is to be described in detail later.

Figure 4:
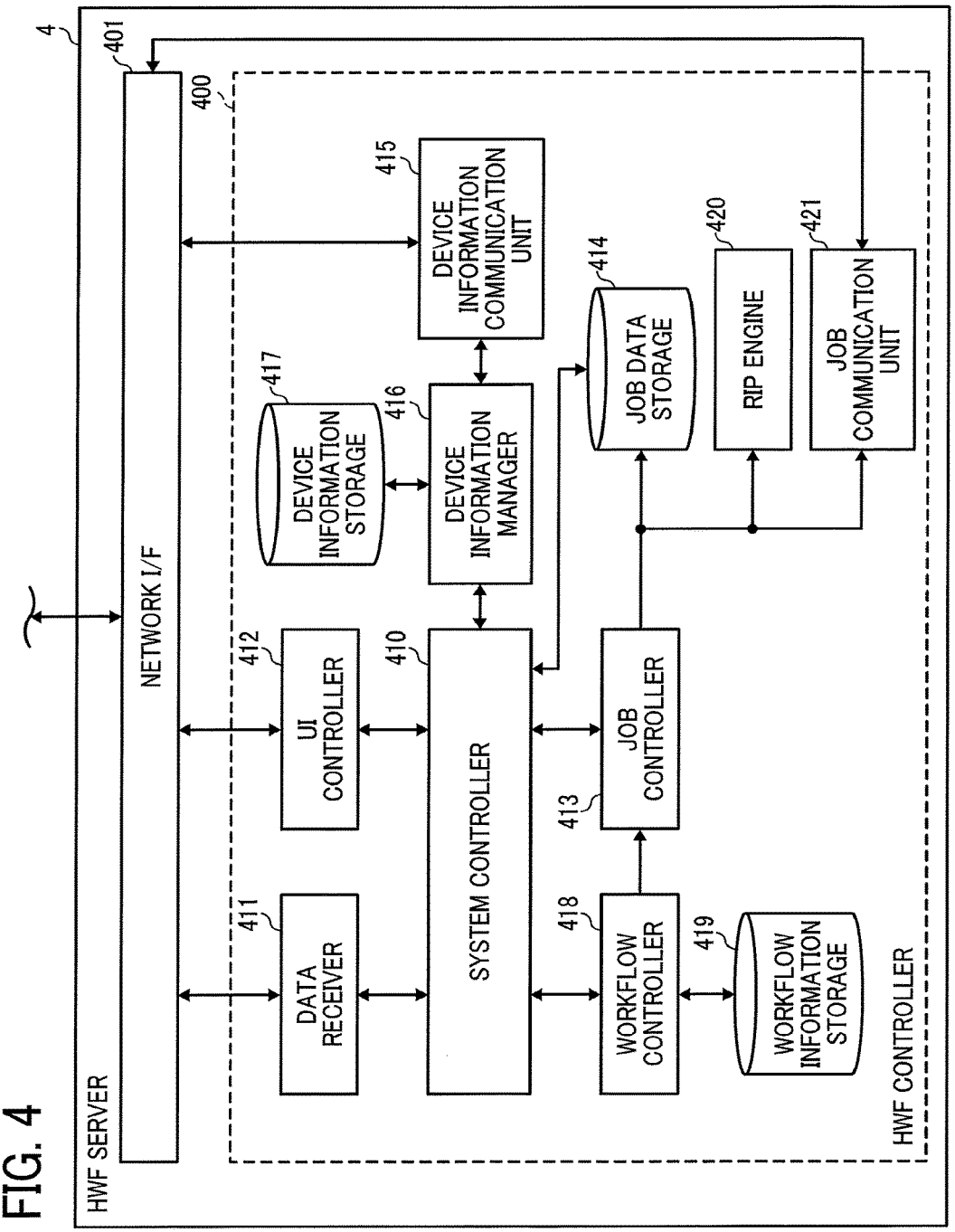
FIG. 4 is illustrates an example of a functional block diagram of a HWF server of an embodiment of the present invention.

A description is given of a functional configuration of the HWF server 4 with reference to FIG. 4. As illustrated in FIG. 4, the HWF server 4 includes, for example, a HWF controller 400, and a network interface (I/F) 401. The network I/F 401 is an interface used for communicating information between the HWF server 4 and other devices or apparatuses available for use via a network.

The HWF controller 400 manages various processing such as acquisition of job data of a print target, a generation of a print job, a management of a workflow, and an allocation of job data to the digital printer 1 and the offset printer 2. A process that job data of a print target is input to the HWF server 4 and acquired by the HWF controller 400 is a process of inputting data to the HWF system 1000. The HWF controller 400 can be implemented by installing a specific software program such as a HWF software program in the information processing apparatus.

As illustrated in FIG. 4, the HWF controller 400 includes, for example, a system controller 410, a data receiver 411, a user interface (UI) controller 412, a job controller 413, a job data storage 414, a device information communication unit 415, a device information manager 416, a device information storage 417, a workflow controller 418, a workflow information storage 419, a RIP engine 420, and a job communication unit 421.

The system controller 410 controls the HWF controller 400 entirely. Therefore, the system controller 410 transmits commands to each of the units in the HWF controller 400 to implement each of the above described functions or capabilities of the HWF controller 400. The data receiver 411 receives to-be-printed job data from other system, or to-be-printed job data input by an operation of an operator.

The UI controller 412 controls an operation operable by an operator via the client terminal 5. For example, a graphical user interface (GUI) used for operating the HWF server 4 is displayed on the client terminal 5, and the UI controller 412 acquires information of an operation performed to the GUI displayed on the client terminal 5 via a network.

The UI controller 412 reports information of the operation acquired via the network to the system controller 410. The display of GUI on the client terminal 5 can be implemented by executing a software program installed in the client terminal 5, or by providing information to the client terminal 5 from the UI controller 412 via the network.

The operator operates the GUI displayed on the client terminal 5 to select job data to be input as a print target. Then, the client terminal 5 transmits the selected job data to the HWF server 4, and then the data receiver 411 acquires the selected job data. The system controller 410 registers the job data acquired by the data receiver 411 to the job data storage 414.

When the job data is to be transmitted from the client terminal 5 to the HWF server 4, the job data is generated in the client terminal 5 based on document data and/or image data selected at the client terminal 5, and then the job data is transmitted to the HWF server 4. The job data is described, for example, in page description language (PDL) format such as portable document format (PDF) and PostScript.

Further, the client terminal 5 can transmit data of a print target to the HWF server 4 by using an application specific data format or a general image data format. In this configuration, the system controller 410 instructs the job controller 413 to generate job data based on the acquired data. The job controller 413 generates the job data based on the data of print target by using the RIP engine 420.

As described above, the data of print target registered in the job data storage 414 is PDL information. The PDL information can be, for example, primary data generated from the data of print target, or intermediate data, which is processed to the middle of the RIP processing. These information such as the primary data and intermediate data can be used as information of an output target image (i.e., output target image information). For example, the intermediate data can be stored in the job data storage 414 when the job data is processed to the middle of the RIP processing that is already started in the HWF server 4, or when the job data is registered in the HWF server 4 with a condition of the intermediate data. Hereinafter, the "PDL information" indicates the primary data that is not yet processed by the RIP processing, and the intermediate data indicates data that is processed to the middle of the RIP processing (i.e., processing-not-completed data) in this disclosure.

Further, as described above, the JDF information illustrated in FIG. 3 can be set and generated by an operation of an operator to the GUI displayed on the client terminal 5. Further, when a job is input to the HWF server 4 from an external system and software, the JDF information may be assigned to the job. The generated or acquired JDF information can be received by the data receiver 411 with the PDL information as the job data. The system controller 410 correlates the acquired JDF information and PDL information, and registers the JDF information and PDL information to the job data storage 414.

In this disclosure, attribution information indicating contents of job data is described by using the JDF information, but not limited hereto. For example, the attribution information indicating the contents of job data can be described by using other format such as print production format (PPF).

Further, the system controller 410 can divide the received job data as required based on an operation of an operator to a GUI displayed on the client terminal 5. For example, the system controller 410 can divide the received job data into a discrete unit of printing portion such as a unit of "page," and each one of the divided job data can be registered in the job data storage 414 as sub job data, in which the job data is configured by the plurality of the sub-job data.

When an output-destination device is selected for each of the sub-job data by an operation of an operator to a GUI displayed on the client terminal 5, the operator's selection result is correlated with the sub-job data, and then stored in the job data storage 414. The output-destination device can be set selectively for each of the sub job data. For example, the digital printer 1 can be selected for printing sub job data corresponding to a cover of the received job data, and the offset printer 2 can be selected for printing sub-job data corresponding to a main contents of the received job data.

The device information manager 416 acquires information of available devices or apparatuses included in the HWF system 1000 such as the digital printer 1, the offset printer 2, the post-processing apparatus 3 or the like, and the device information manager 416 stores information of the available devices or apparatuses in the device information storage 417, and manages the information of the available device or apparatuses. The information of available devices includes, for example, a network address allocated to each device when the device is connected to the network, and device capability information of each device. The device capability information includes, for example, printing speed, available post-processing capability, and operational condition.

The device information communication unit 415 can acquire information of the available devices included in the HWF system 1000 at regular intervals via the network I/F 401. With this configuration, the device information manager 416 can update information of the available devices stored in the device information storage 417 at regular intervals. Therefore, even if the information of the available devices changes over time, the information stored in the device information storage 417 can be updated and maintained at the latest status.

The workflow controller 418 determines an execution sequence of a plurality of processes to be executed for the job data registered in the job data storage 414 in the HWF system 1000, and stores information of the execution sequence in the workflow information storage 419. Based on the execution sequence set for each of processes in a workflow in advance, the workflow controller 418 can control the execution sequence, in which when one process completes, the sequence proceeds to the next process.

The workflow information stored in the workflow information storage 419 specifies the execution sequence of each of processes executable in the HWF system 1000, in which the processes are sequentially arranged based on the designated execution sequence. FIG. 5 is an example of workflow information. Further, parameters, which are used when each of the processes is executed, can be designated as the JDF information as above described. The workflow information storage 419 registers the workflow information in advance based on an operation of an operator to the GUI displayed on the client terminal 5.

An execution instruction of the job data, registered in the HWF server 4, is reported to the system controller 410 via the UI controller 412 based on an operation of an operator to the GUI displayed on the client terminal 5. With this configuration, the system controller 410 can select the above described output-destination device.

When the output-destination device is selected by using the GUI displayed on the client terminal 5 as described above, the system controller 410 selects the output-destination device based on a designation of the output-destination device. Further, the output-destination device can be selected automatically based on a comparison of contents of job data and a device property.

When the output-destination device is selected automatically based on the comparison of contents of job data and the device property, the system controller 410 acquires information of device available for use from the device information manager 416. When the output-destination device is determined as above described, the system controller 410 assigns information indicating the determined output-destination device to the JDF information.

After determining the output-destination device, the system controller 410 instructs the workflow controller 418 to execute a job. In this process, the workflow information, registered in the workflow information storage 419 in advance based on the operation of the operator, can be used. Further, a new workflow information can be generated and then used based on contents set by the operator.

After receiving the execution instruction from the system controller 410, the workflow controller 418 instructs the job controller 413 to execute each of the processes based on the designated execution sequence of the designated workflow information or the newly generated workflow information. Therefore, the workflow controller 418 can be used as a process execution controller or the processing execution control unit.

After receiving the execution instruction, the job controller 413 inputs the above described PDL information and JDF information to the RIP engine 420 to execute the RIP processing. The JDF information includes information that indicates which one of the HWF server 4 and the DFE 100 is used for processing each of internal processes of the RIP processing using the RIP engine.

The job controller 413 refers or checks allocation information of the RIP processing included in the JDF information. If one process designated by the workflow controller 418 is a process to be executed by the HWF server 4, the job controller 413 instructs the RIP engine 420 to execute the designated one process. Based on the instruction from the job controller 413, the RIP engine 420 executes the RIP processing based on parameters designated in the JDF information.

After executing the RIP processing, the RIP engine 420 updates the RIP status of each of the processes executed by the RIP processing. With this configuration, the status of each of the internal processes of the RIP processing executed by the HWF server 4 is changed from "NotYet" to "Done." The RIP engine 420 can be used as a control-side image drawing information generator, a control-side drawing information generator or a first image drawing information generator.

The RIP-executed result data generated by executing the RIP processing is any one of PDL information, intermediate data, and raster data. Any one of the PDL information, intermediate data, or raster data can be used depending on the internal process of the RIP processing. Specifically, as the sequence proceeds, the intermediate data is generated from the primary data such as PDL information, and the raster data is generated as final data from the intermediate data. The RIP-executed result data is correlated with a being-executed job, and stored in the job data storage 414.

When each one of the internal processes of RIP processing is completed, the RIP engine 420 reports the completion of each one of the internal processes to the job controller 413, and the job controller 413 reports the completion of each one of the internal processes to the workflow controller 418. With this configuration, the workflow controller 418 starts to control a subsequent or next process based on the workflow information.

If the contents of job data received from the workflow controller 418 is a request to the other system, the job controller 413 inputs job data, compatible to the other system, to the job communication unit 421, and instructs the job communication unit 421 to transmit the job data. If the job data is to be transmitted to the offset printer 2, the job data of a print target is converted into the raster data, and then the raster data is transmitted to the offset printer 2 as the job data.

Further, if the job data is to be transmitted to the digital printer 1, the job controller 413 inputs the job data to the job communication unit 421 while designating a RIP engine having capabilities compatible with the RIP engine 420 from a plurality of the RIP engines included in the DFE 100. With this configuration, the job communication unit 421 transmits the job data to the DFE 100 by designating the RIP engine that is the same type of the RIP engine 420.

The job communication unit 421 transmits the job data such as a package of PDL information and JDF information or a package of intermediate data and JDF information to the DFE 100. Further, the PDL information or intermediate data can be transmitted to the DFE 100 separately from the JDF information, in which the PDL information or intermediate data can be prepared as external resource data, and the JDF information can include universal resource locators (URL) indicating a storage area of the PDL information or a storage area of intermediate data. In this configuration, the DFE 100 that receives the JDF information can access the storage area specified by the URL to acquire the PDL information or intermediate data.

Figure 6:
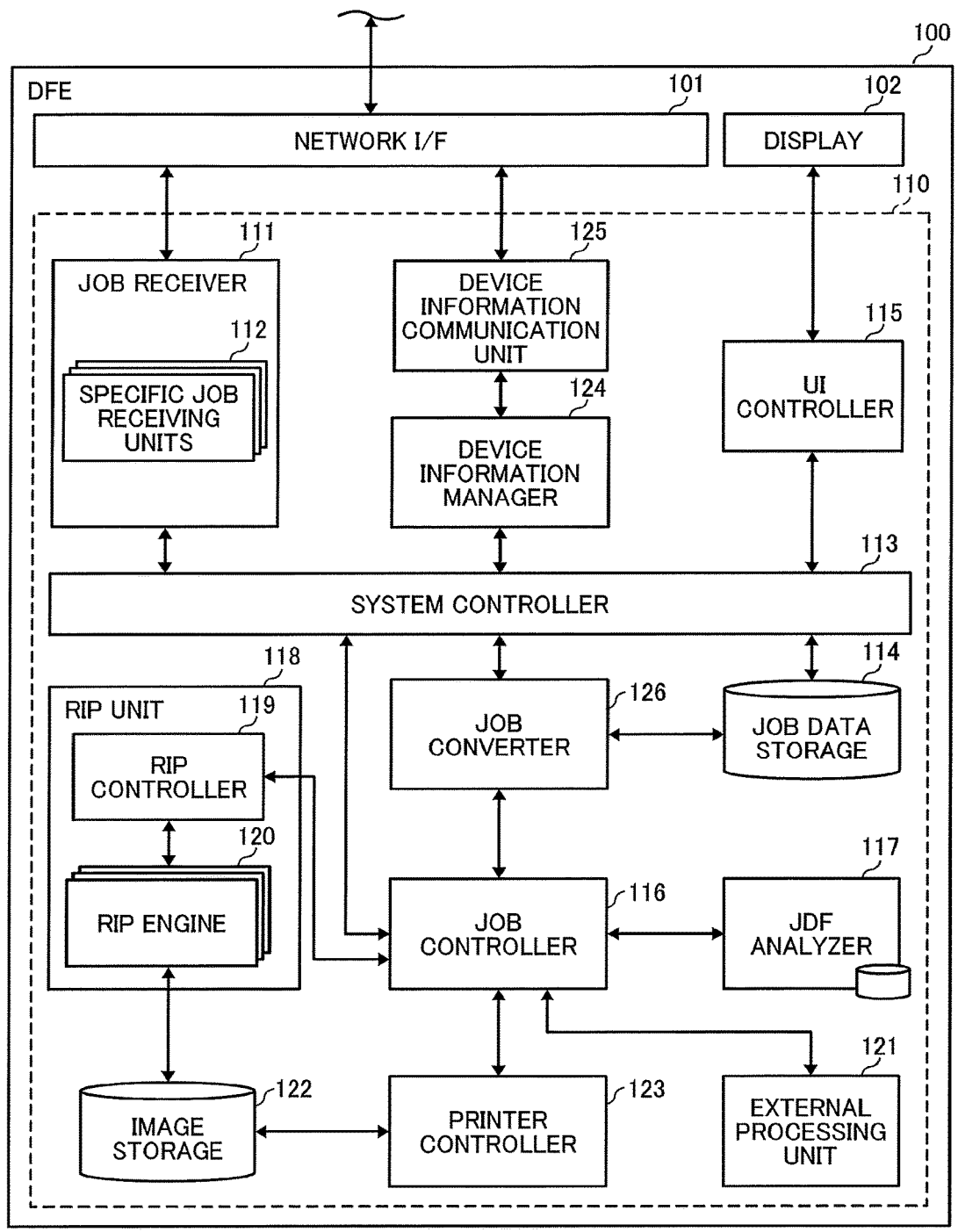
FIG. 6 is illustrates an example of a functional block diagram of a DFE of an embodiment of the present invention.

A description is given of a functional configuration of the DFE 100 with reference to FIG. 6. When the DFE 100 receives job data from the HWF server 4, the DFE 100 controls the received job, an execution of the RIP processing, and the digital engine 150. The HWF server 4 transmits the job data to the DFE 100 and instructs the DFE 100 to execute a print output operation by using the digital engine 150. Therefore, the DFE 100 can be used as a device to provide digital printing capability to the HWF server 4.

The job control capability performable by the DFE 100 is a process of controlling a series of processes such as a reception of job data, an analysis of JDF information, a generation of raster data, and a print output operation by the digital engine 150. The execution control of the RIP processing is a process of controlling the RIP engine to execute the RIP processing based on information generated by the analysis of the JDF information and PDL information.

The information that is generated by analyzing the JDF information means that information used for the RIP processing is extracted from the JDF information (FIG. 3), and is then converted into a data format interpretable by the DFE 100, which is referred to "job attribute in DFE" in this disclosure. By executing the RIP processing by using the job attribute in DFE and the PDL information, the intermediate data and raster data can be generated.

The control capability of the digital engine 150 is a process of transmitting raster data and at least a part of the above described job attribute in DFE to the digital engine 150, and executing the print output operation by the digital engine 150. These capabilities can be implemented by each of units illustrated in FIG. 6. Each of the units illustrated in FIG. 6 can be implemented by activating the hardware (FIG. 2) by loading programs stored in the ROM 30 on the RAM 20 and executing the loaded programs by using the CPU 10.

As illustrated in FIG. 6, the DFE 100 includes, for example, a network I/F 101, a DFE controller 110, and a display 102. The DFE controller 110 includes, for example, a job receiver 111 including a plurality of specific job receiving units 112, a system controller 113, a job data storage 114, a UI controller 115, a job controller 116, a JDF analyzer 117, a RIP unit 118 including a RIP controller 119 and a plurality of RIP engines 120, an image storage 122, a printer controller 123, a device information manager 124, a device information communication unit 125, and a job converter 126.

The DFE 100 can include a plurality of RIP engines therein, and each of the plurality of RIP engines is compatible with each of RIP engines of other available devices in the HWF system 1000. Specifically, each of the plurality of RIP engines of the DFE 100 is compatible with each of the RIP engines of other available devices that transmits job data to the DFE 100 in the HWF system 1000. Since the HWF servers 4a and 4b include different RIP engines, a plurality of the RIP engines compatible with the RIP engines of HWF servers 4a and 4b is disposed in the DFE 100.

The job receiver 111 including a plurality of specific job receiving units 112 can be used as a command information receiver. In this configuration, each of the specific job receiving units 112 receives job data from the HWF server 4 via the network I/F 101, and the plurality of specific job receiving units 112 respectively corresponds to the plurality of RIP engines 120 disposed in the DFE 100.

As described above, when job data is transmitted from the HWF server 4 to the DFE 100, the corresponding RIP engine 120 is designated, and the job data is transmitted to the corresponding designated RIP engine 120. Therefore, the specific job receiving unit 112 in the job receiver 111, corresponding to the designated RIP engine 120, receives the job data.

In the above described configuration, the job data can be input to the DFE 100 from the HWF server 4 via a network. Further, the job data can be input to the DFE 100 via a portable memory such as a universal serial bus (USB) memory. In this disclosure, it is assumed that the JDF information is included in the job data. If the JDF information is not included in the job data, the job receiver 111 generates dummy JDF information, and assigns the dummy JDF information to the job data.

The specific job receiving unit 112 can be disposed for each of the above described RIP engines 120. Further, each of the specific job receiving unit 112 can be used as a virtual printer set with contents of job data in advance. Specifically, each of the specific job receiving units 112 can be set with the corresponding RIP engine 120 disposed in the DFE 100 and contents of job data in advance, and then, by designating one of the plurality of specific job receiving units 112, the job can be executed with the contents set in advance.

In the embodiment, when the specific job receiving unit 112 is used as the virtual printer, information of the JDF description conversion program 128 to be applied to the input job data is set in each of the job receiving units 112. When the job data is input from the HWF server 4 to the DFE 100 while designating the specific job receiving unit 112, the specific job receiving unit 112 converts the JDF information included in the job data into a format processable or interpretable by the DFE 100. Therefore, each of the specific job receiving units 112 can be used as an output-side command information receiver.

The system controller 113 stores the job data received by the specific job receiving unit 112 in the job data storage 114, or transfers the job data received by the specific job receiving unit 112 to the job controller 116. If the DFE 100 is configured to store the job data, the system controller 113 stores the job data in the job data storage 114. Further, if the JDF information includes a description of whether the job data is to be stored in the job data storage 114 or not, the system controller 113 performs the processing according to the description of the JDF information.

The job data is stored in the job data storage 114, for example, when a preview of print contents is performed by the DFE 100, or when the JDF information included in the job data is converted into a format compatible with the DFE 100 such as a format processable or interpretable by the DFE 100.

When the preview of print contents is performed by the DFE 100, the system controller 113 acquires data of a print target included in the job data, which is PDL information and intermediate data, from the job data storage 114 to generate preview data, and transfers the preview data to the UI controller 115. With this configuration, the UI controller 115 controls the display 102 to display a preview of the print contents on the display 102.

When the JDF information included in the job data is to be converted into a format processable or interpretable by the DFE 100, the system controller 113 temporarily stores the job data in the job data storage 114. Then, the system controller 113 transfers the JDF information included in the stored job data to the job converter 126. When the job converter 126 receives the JDF description, the job converter 126 executes the JDF description conversion program 128 on the received JDF information, and converts a format (first format) set in the received JDF information into a format (second format) processable or interpretable by the DFE 100.

The job converter 126 executes the JDF description conversion program 128 on the JDF information received from the job data storage 114 to replace text description included in the JDF information, or to convert a format of an attribute description of data having a hierarchy configuration in the JDF information into a format processable or interpretable by the DFE 100. Therefore, the job converter 126 can be used as a process setting information description conversion control unit or description conversion control unit that executes the JDF description conversion program 128 to convert the description of JDF information used as process setting information received from the HWF server 4. The conversion of the description of JDF information by the job converter 126 is to be described later.

When the preview data is to be generated, the system controller 113 transfers the data of print target to the job controller 116, and requests the job controller 116 to generate the preview data. The job controller 116 transfers the data of print target to the RIP unit 118 to generate the preview data, and the job controller 116 receives the generated preview data, and transfers the generated preview data to the system controller 113.

Further, when an operator changes settings such as the JDF information to be used for the DFE 100 when performing the printing operation, the job data having the changed JDF information is stored in the job data storage 114. In this case, the system controller 113 acquires the JDF information from the job data storage 114, and transfers the JDF information to the UI controller 115. With this configuration, the JDF information of the job data is displayed on the display 102, and the operator can change the JDF information by performing an operation on the display 102.

When the operator changes the JDF information by operating the DFE 100, the UI controller 115 receives the changed information, and reports the changed information to the system controller 113. The system controller 113 applies the received changed information to the target JDF information to update the target JDF information, and stores the updated target JDF information in the job data storage 114.

When the system controller 113 receives the job execution instruction, the system controller 113 reads out the job data stored in the job data storage 114, and transfers the job data to the job controller 116. The job execution instruction can be input from the HWF server 4 via the network or the job execution instruction can be input by an operation of an operator to the DFE 100. Further, if the JDF information is set with, for example, the execution time, the system controller 113 transfers the job data stored in the job data storage 114 to the job controller 116 when the set execution time has come.

The job data storage 114 is a memory or a storage area to store the job data, which can be implemented, for example, by the HDD 40 illustrated in FIG. 2. Further, the job data can be stored in a memory or a storage area connected to the DFE 100 via a universal serial bus (USB) interface, or can be stored in a memory device connected via a network.

As described above, the UI controller 115 controls the display 102 to display information, and receives an operation of an operator to the DFE 100. When the above described editing process is performed to the JDF information, the UI controller 115 interprets the JDF information, and displays contents of the print job on the display 102.

The job controller 116 controls the job execution when the job execution instruction is transmitted from the system controller 113. Specifically, the job controller 116 controls the JDF analysis process by the JDF analyzer 117, the RIP processing by the RIP unit 118, and the control of the digital engine 150 by the printer controller 123.

When the job controller 116 receives the job execution instruction from the system controller 113, the job controller 116 inputs the JDF information included in the job data to the JDF analyzer 117 to request a conversion of JDF. The JDF conversion request is a request of converting the JDF information described by a format used by an original or initial generator of the JDF information to a format decodable or interpretable by the RIP unit 118.

The JDF analyzer 117 converts the JDF information described with the format used by the original generator to the format decodable or interpretable by the RIP unit 118. The JDF analyzer 117 retains a conversion table therein, extracts information required for the RIP unit 118 from information included in the JDF information, and converts a description format of the extracted information based on the conversion table. With this configuration, the above described job attribute in DFE can be generated.

In this configuration, when the job converter 126 converts the description of the JDF information input to the DFE 100, the JDF information described in one format included in the job data not processable or interpretable by the DFE 100 is converted into the JDF information described in another format processable or interpretable by the DFE 100. By contrast, the JDF analyzer 117 converts one or more information items included in the JDF information to be used alone in the RIP unit 118 into a format processable by the RIP unit 118.

Therefore, in the embodiment, the JDF information converted by the job converter 126 may be input to the JDF analyzer 117 while the job attribute in DFE generated by the JDF analyzer 117 is not input to the job converter 126.

FIG. 7 is an example of a conversion table retainable by the JDF analyzer 117. As illustrated in FIG. 7, the conversion table correlates a description format of JDF information and a description format of job attribute in DFE. For example, information of "number of copies" illustrated in FIG. 3 is described as "A-Amount" in the original or initial JDF information, and "A-Amount" is converted into a description of "number of copies" when generating the job attribute in DFE.

The job attribute in DFE can be generated by the JDF analyzer 117 based on the conversion table of FIG. 7. The information described in the job attribute in DFE includes, for example, "job information," edit information," and "finishing information" indicated in FIG. 3.

The JDF analyzer 117 sets the "RIP control mode" to the job attribute in DFE when generating the job attribute in DFE. The "RIP control mode" includes the "page mode" and "sheet mode." The JDF analyzer 117 assigns or allocates the "RIP control mode" based on a type of the specific job receiving unit 112 that has received the job data, contents of job data, and HWF software program installed in the HWF server 4 used as a transmission source of the job data.

In the configuration described in this description, condensed or combined printing for a print job can be set by using the "page mode." The "RIP control mode" is to be described later in detail.

Based on the job attribute in DFE generated by the JDF analyzer 117, the job controller 116 generates "RIP parameter," and transfers the "RIP parameter" to the RIP controller 119 in the RIP unit 118 to execute the RIP processing. With this configuration, the RIP unit 118 can execute the RIP processing based on the "RIP parameter."

FIG. 8 is an example of one set of RIP parameters of an embodiment. The RIP parameters include, for example, "type of input/output data," "data reading information," and "RIP control mode" as header information. The "type of input/output data" designates the type of input/output data such as JDF, PDL or the like. The designatable format is, for example, JDF, PDL, text format, extension of image data, and intermediate data.

The "data reading information" includes information on a designation method and a designation position of a reading position and writing position of the input/output data. The "RIP control mode" is information that designates the "page mode" and "sheet mode." The header information further includes, for example, information of "unit" used in the RIP parameter, and information of compression method of data.

The "input/output image information" includes, for example, "information of output image," "information of input image," and "information of image processing." The "information of output image" includes information of, for example, format, resolution, size, color separation, color shift, and page orientation of output image data. The "information of input image" includes information of, for example, format, resolution, page area, and color settings of input image data. The "information of image processing" includes information of, for example, an offset of enlargement/reduction algorism, an object area, and an offset of halftone.

The "PDL information" is information related to PDL information used for the RIP parameter. The "PDL information" includes information of, for example, "data area," "size information," and "data arrangement method." In this disclosure, the PDL information is data of print target in a job, and includes a case of intermediate data. The "data area" designates information of an area where the PDL information is stored. The "size information" designates a data size of the PDL information. The "data arrangement method" designates a data arrangement pattern in a memory storing the PDL information such as "little big endian" and "big endian."

As illustrated in FIG. 8, the RIP parameter includes the "RIP control mode." The RIP controller 119 controls the RIP engine 120 based on the "RIP control mode." Therefore, the sequence is set based on the "RIP control mode." As above described, the "page mode" and "sheet mode" can be set as the "RIP control mode."

The "page mode" and "sheet mode" are performed to a plurality of pages to generate raster data. As to the "page mode," the RIP processing is performed for each page of the plurality of pages, and then raster data condensing the plurality of RIP-processed pages on one single sheet is generated. As to the "sheet mode," a plurality of pages are condensed on a single sheet at first, and then the RIP processing is performed for each part (i.e., each page) on the single sheet to generate raster data condensing the plurality of pages on the single sheet.

Further, the job controller 116 sets "RIP engine identification information" in the RIP parameter. The "RIP engine identification information" is information identifying each one of the plurality of the RIP engines 120 included in the RIP unit 118. In this configuration, the same RIP engine is used in the HWF server 4 as the RIP engine 420, and in the DFE 100 as the RIP engine 120.

Therefore, the JDF information includes information designating the specific job receiving unit 112 as described above, and the designated specific job receiving unit 112 receives the job data. Each one of the specific job receiving units 112 corresponds to corresponding one of the RIP engines 120, and identification information of the corresponding RIP engine 120 is added to the received JDF information. Based on the identification information of the RIP engine 120 added to the JDF information, the job controller 116 adds the "RIP engine identification information" to the RIP parameter.

Further, when the description of JDF information is to be converted, information designating the specific job receiving unit 112 is included in the JDF information. When the specific job receiving unit 112 designated by the JDF information receives the job data, the specific job receiving unit 112 transfers the received job data to the job converter 126, and then the job converter 126 converts a description of JDF information. For example, the job converter 126 converts a description of JDF information in one format (e.g., first format) into the description of JDF information in another format (e.g., second format).

As to the RIP unit 118, the RIP controller 119 controls the plurality of RIP engines 120 to execute each of the internal processes of RIP processing based on the input RIP parameters to generate raster data. Therefore, the RIP controller 119 can be used as an output-side image drawing information generation controller that instructs the RIP engine 120, used as an output-side image drawing information generator, to generate the raster data as second image drawing information to be used in the digital engine 150 used as the image generator or print engine.

The image storage 122 is a memory or a storage area to store raster data generated by the RIP engine 120. The image storage 122 can be implemented, for example, by the HDD 40 illustrated in FIG. 2. Further, the image storage 122 can be a memory or a storage connected to the DFE 100 via a universal serial bus (USB) interface, or can be a memory connected via a network.

The printer controller 123 is connected to the digital engine 150. The printer controller 123 reads the raster data stored in the image storage 122, and transmits the raster data to the digital engine 150 to execute a print output operation. Further, the printer controller 123 acquires the finishing information included in the job attribute in DFE from the job controller 116 to control a finishing process.

The printer controller 123 can communicate information with the digital engine 150 to acquire information of the digital engine 150. For example, when CIP4 standard is used, DevCaps standard is defined as the JDF information standard for communicating device property information with a printer. Further, printer information can be collected by using a communication protocol such as simple network management protocol (SNMP) and a database such as management information base (MIB).

The device information manager 124 manages the device information such as information of the DFE 100 and the digital engine 150. The device information includes, for example, information of the RIP engines 120 included in the RIP unit 118, and information of the specific job receiving units 112 in the job receiver 111

The device information communication unit 125 communicates the device information with the HWF server 4 via the network I/F 101 using a compatible format such as MIB and job messaging format (JMF). With this configuration, the device information communication unit 415 of the HWF server 4 can acquire the device information from the DFE 100, with which information of the RIP engines 120 and information of the specific job receiving units 112 included in the DFE 100 can be set to a GUT settable and displayable on the client terminal 5.

As to the DFE 100, when the printer controller 123 controls the digital engine 150, and then a print output operation is completed, the system controller 113 recognizes the completion of the print output operation via the job controller 116. Then, the system controller 113 reports the completion of a job to the HWF server 4 via the job receiver 111. With this configuration, the job communication unit 421 of the HWF server 4 receives a report of the completion of the job.

As to the HWF server 4, the job communication unit 421 transfers the report of the completion of the job to the job controller 413, and then the job controller 413 reports the completion of the job to the workflow controller 418. The transmission of the job data from the HWF server 4 to the DFE 100 is executed by the workflow controller 418 based on the workflow information.

When the workflow controller 418 receives the completion of the job by the DFE 100, the workflow controller 418 controls a next process based on the workflow information. A process to be performed after performing the print output operation by the DFE 100 is, for example, a post-processing by the post-processing apparatus 3.

Figure 9:
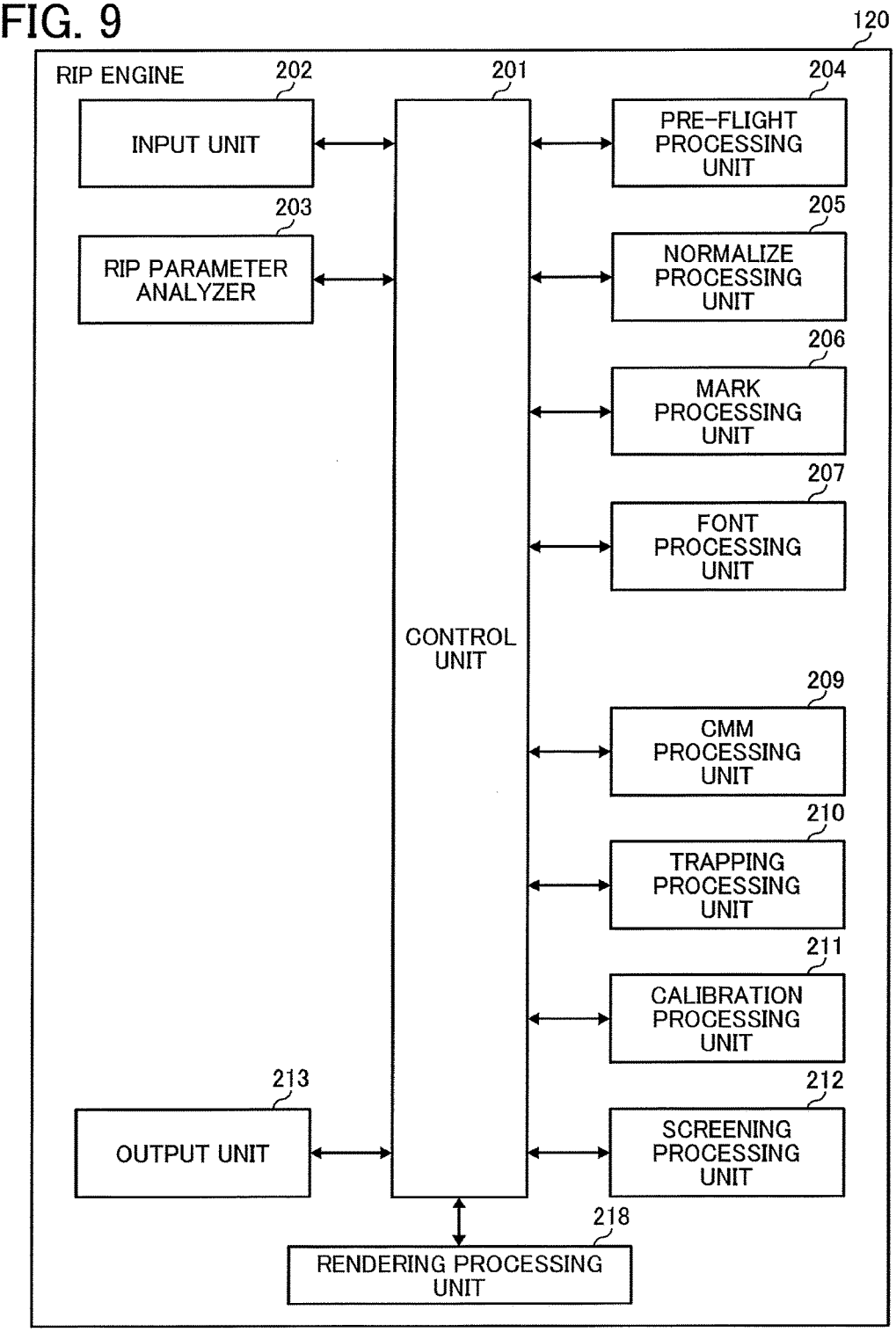
FIG. 9 illustrates an example of a functional block diagram of a RIP engine of an embodiment of the present invention.

A description is given of a functional configuration of the RIP engine of the embodiment. FIG. 9 is a functional configuration of the RIP engine 120 having the JDF analyzer 117 used for the JDF analysis process. As above described, the RIP engine 120 can be a software module that executes each of the internal processes of RIP processing to generate raster data based on the RIP parameter illustrated in FIG. 8. The RIP engine 120 can be, for example, an Adobe PDF printing engine (APPE) provided by Adobe systems, but not limited hereto.

As illustrated in FIG. 9, the RIP engine 120 is configured by a control unit 201 and other units. The other units can be employed as extended units, which can be extended by a vendor. The control unit 201 executes the RIP processing by using various capabilities that can be implemented as the extended units. Specifically, as illustrated in FIG. 9, the RIP engine 120 includes the control unit 201 and the extended units such as an input unit 202, a RIP parameter analyzer 203, a pre-flight processing unit 204, a normalize processing unit 205, a mark processing unit 206, a font processing unit 207, a color management module (CMM) processing unit 209, a trapping processing unit 210, a calibration processing unit 211, a screening processing unit 212, an output unit 213, and a rendering processing unit 218.

The input unit 202 receives an initialization request, and an execution request of the RIP processing, and reports the request to the control unit 201. When the initialization request is received, the above described RIP parameter is also input to the control unit 201. When the control unit 201 receives the initialization request, the control unit 201 inputs the RIP parameter, received at the same time with the initialization request, to the RIP parameter analyzer 203. Then, the control unit 201 acquires an analysis result of the RIP parameter, computed by the RIP parameter analyzer 203, and determines an activation sequence of each of the extended units included in the RIP engine 120 when the RIP processing is performed. Further, the control unit 201 determines a data format of data to be generated by performing the RIP processing, in which the data format can be any one of the raster image, preview image, PDF, and intermediate data.

Further, when the control unit 201 receives the execution request of the RIP processing from the input unit 202, the control unit 201 activates each of the extended units included in the RIP engine 120 based on the activation sequence that is determined when the control unit 201 receives the initialization request. The pre-flight processing unit 204 checks validity of input PDL data contents. If the pre-flight processing unit 204 detects an illegal PDL attribute, the pre-flight processing unit 204 reports the illegal PDL attribute to the control unit 201. When the control unit 201 receives this report, the control unit 201 reports the illegal PDL attribute to an external module such as the RIP controller 119 and the job controller 116 via the output unit 213.

The pre-flight processing checks whether attribute information that disenables a processing by other modules included in the RIP engine 120 is included in the received data. For example, the pre-flight processing checks whether a font unable to be processed is designated or not.

The normalize processing unit 205 converts the input PDL data to PDF if the input PDL data is not PDF but is PostScript. The mark processing unit 206 applies graphic information of a designated mark, and superimposes the graphic information at a designated position on an output target print image such as a target print image.

The font processing unit 207 extracts font data, and embeds the font to PDL data, and outlines the font. The color management module (CMM) processing unit 209 converts a color space of an input image to cyan, magenta, yellow, black (CMYK) based on a color conversion table set by International Color Consortium (ICC) profile. The ICC profile includes color ICC information, and device ICC information.

The trapping processing unit 210 performs trapping processing. When different color regions are set adjacently via boundaries of the different color regions, a gap may occur at the boundaries when a positional error occurs for the adjacently-set different color regions. The trapping processing expands each of the color regions to fill the gap.

The calibration processing unit 211 adjusts fluctuation of generated color balance, caused by aging and individual difference of an output device, to enhance precision of color conversion by the CMM processing unit 209. Further, the processing by the calibration processing unit 211 can be performed outside the RIP engine 120.

The screening processing unit 212 generates halftone dots in view of a final output such as printed sheet. Further, the processing by the screening processing unit 212 can be performed outside the RIP engine 120 similar to the calibration processing unit 211. The output unit 213 transmits a RIP processing result to the outside of the RIP engine 120. The RIP processing result is any one of raster image, preview image, PDF, and intermediate data that are determined when the initialization is performed.

The rendering processing unit 218 performs a rendering processing to generate the raster data based on the input data. Further, as to the configuration of FIG. 9, the processing of the mark processing unit 206, and the processing of the font processing unit 207 can be collectively executed by the rendering processing unit 218.

Figure 10:
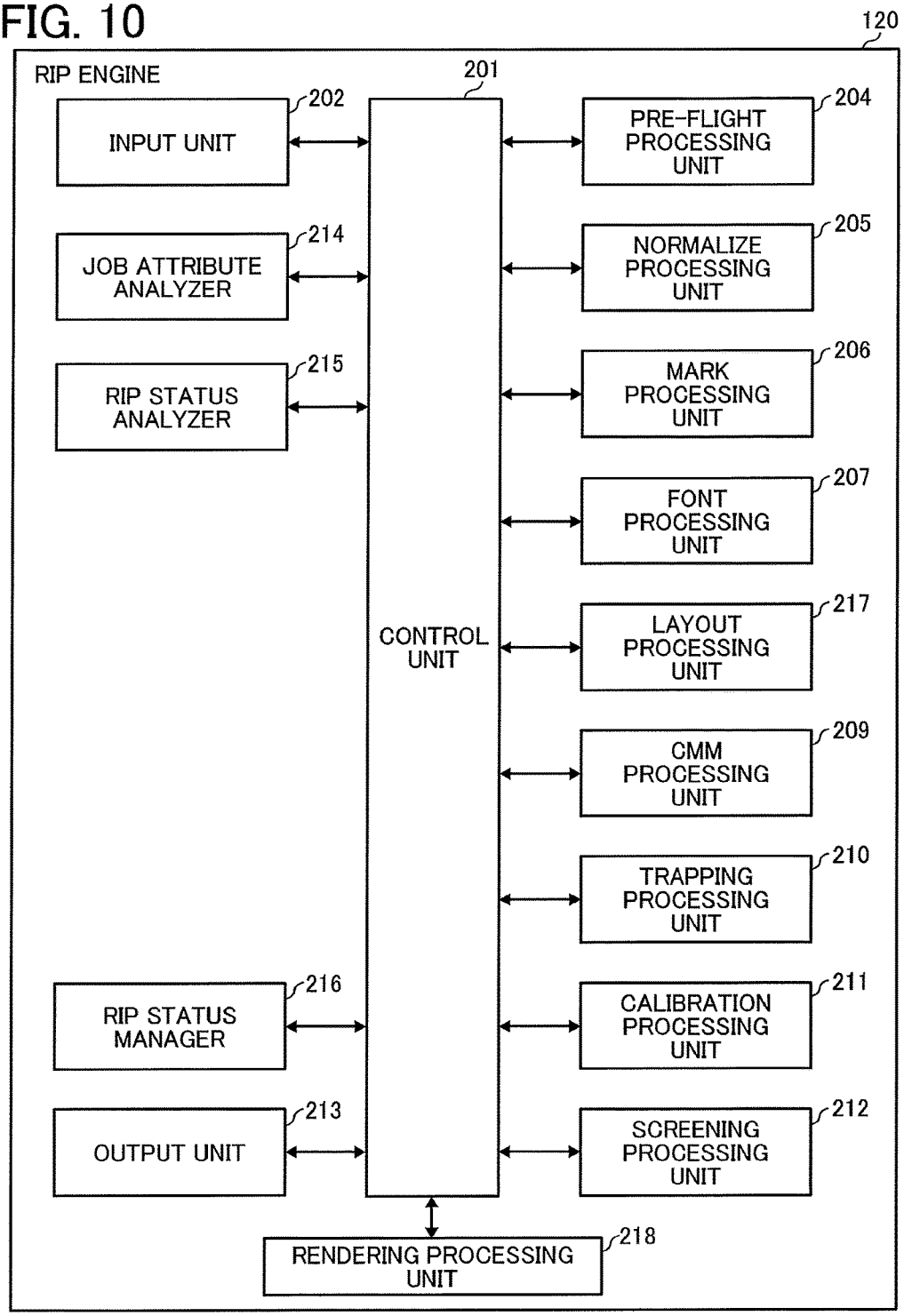
FIG. 10 illustrates another example of a functional block diagram of a RIP engine of an embodiment of the present invention.

A description is given of another functional configuration of the RIP engine 120 with reference to FIG. 10. FIG. 10 is another functional configuration of the RIP engine 120 without using the JDF analysis process by the JDF analyzer 117. As above described, a case that the JDF analyzer 117 does not perform the JDF analysis process means that the internal processes of RIP processing are performed by the HWF server 4 and the DFE 100 as the distributed processing. Therefore, the HWF server 4 includes the RIP engine 420 having the same configuration of the RIP engine 120 illustrated in FIG. 10.

As illustrated in FIG. 10, most of the functional configuration of the RIP engine 120 not using JDF analysis process by the JDF analyzer 117 are same as the functional configuration of the RIP engine 120 of FIG. 9. Hereinafter, portions different from the configuration of FIG. 9 are described. Similar to FIG. 9, the units other than the control unit 201 can be used as the extended units.

Specifically, as illustrated in FIG. 10, the RIP engine 120 includes the control unit 201 and the extended units such as the input unit 202, the pre-flight processing unit 204, the normalize processing unit 205, the mark processing unit 206, the font processing unit 207, the color management module (CMM) processing unit 209, the trapping processing unit 210, the calibration processing unit 211, the screening processing unit 212, the output unit 213, a job attribute analyzer 214, a RIP status analyzer 215, a RIP status manager 216, a layout processing unit 217, and the rendering processing unit 218.

As to the configuration of FIG. 10, when the control unit 201 receives an initialization request from the input unit 202, the control unit 201 acquires the initialization request and the JDF information. Then, the control unit 201 analyzes the JDF information and PDL information by using the job attribute analyzer 214, and the control unit 201 determines a process sequence of the extended units, and a data format to be generated as a process result of each of the extended units same as the configuration of FIG. 9.

As to the RIP engine 120 disposed in the DFE 100, a data format obtained as a process result by the RIP engine 120 is often the raster data to be input to the printer controller 123. By contrast, as to the RIP engine 420 disposed in the HWF server 4, a data format obtained as a process result by the RIP engine 420 becomes different depending on how the processing is distributed between the HWF server 4 and the DFE 100. Therefore, the control unit 201 of the RIP engine 120 determines the data format (e.g., PDL information, intermediate data) of the process result based on an analysis result by the job attribute analyzer 214.

Further, the control unit 201 analyzes the RIP status information included in the JDF information by using the RIP status analyzer 215 to check whether one or more already-executed internal processes of RIP processing exist. If the already-executed internal process of the RIP processing unit exists, the corresponding extended unit is excluded from the target processing units of the RIP processing.

Further, while the RIP status analyzer 215 can analyze the RIP status included in the JDF information as described in this description, the RIP status analyzer 215 can similarly analyze the RIP status based on PDL information. In a case of analyzing the PDL information, since the attribute information such as parameter is deleted for the already-executed internal processes of RIP processing, the RIP status analyzer 215 can determine which one or more of the internal processes of RIP processing are not yet performed based on the remaining attribute information.

The layout processing unit 217 performs the imposition process. Under the control of the control unit 201, the RIP status manager 216 changes the RIP status corresponding to each of the internal processes of RIP already performed by each of the extended units to "Done". The output unit 213 transmits a RIP result to the outside of the RIP engine 120. The RIP result is data having the data format that is determined when the initialization is performed.

The rendering processing unit 218 of FIG. 10 performs the rendering processing to generate the raster data based on the input data same as the configuration of FIG. 9. Further, as to the configuration of FIG. 10, the processing of the mark processing unit 206, the processing of the font processing unit 207, and further the processing of the layout processing unit 217 can be collectively executed by the rendering processing unit 218.

Further, as described above, the plurality of the RIP engines 120 disposed in the DFE 100 such as "DFE (engine A)" and "DFE (engine B)" can be selectively used depending on information of the "RIP device designation" included in the JDF information. Since the control unit 201 is not able to allocate the processing to the extended units of other RIP engine, the job controller 116 is used to allocate the processing.

As described above, the job controller 116 adds the "RIP engine identification information" to the RIP parameter. In this case, the job controller 116 generates different RIP parameters for each of the different internal processes of RIP processing designated with different RIP engines 120. In an example case of FIG. 3, the RIP parameter of "engine A" is generated for executing the "font" and "layout," and the "mark" while the RIP parameter of "engine B" is generated for executing the subsequent processes after the "mark" as illustrated in FIG. 3.

Then, the job controller 116 requests the RIP unit 118 to perform the RIP processing based on each of the generated RIP parameters with a process sequence set for each of the internal processes of RIP processing. With this configuration, each of the internal processes of RIP processing can be performed by selectively using the different RIP engines such as "engine A" and "engine B."

Then, the job controller 116 transmits job data to the designated RIP engine 120. Further, the RIP engine 120 can be configured to perform the designated processing alone to the job data by using a method of referring the "RIP status" information. In this process, each of the RIP engines 120 can perform the designated process alone by referring the "RIP status" information. Specifically, by setting the status of to-be-processed image processing items as "NotYet" and the status of other image processing items as "Done," the designated process alone can be performed.

As to the HWF system 1000 of the embodiment, a print job applied with the extended JDF information, uniquely extended by a vendor, is executed to enable to use capability of one or more extended units. As to the HWF system 1000 of the embodiment, a description rule of JDF information interpretable by the DFE 100, used as the image data processing controller or image generation-output control apparatus, and a description rule of the extended JDF information may be different in some cases. When the DFE 100 uses the JDF information described by one description rule different from the description rule interpretable by the DFE 100, a process result by the DFE 100 becomes different from a user intension.

When the description rule of JDF information interpretable by the DFE 100 and the description rule of the extended JDF information are different, the description of the JDF information of the print job described by the description rule not interpretable by the DEF 100 is converted into the JDF information described by the description rule interpretable by the DFE 100. With this configuration, even when the extended JDF information extended by a vendor is used for the HWF system 1000, the image generation and output matched to a user intention or desire can be executed in the embodiment.

Further, as to the above described HWF system 1000 of the embodiment, the RIP engine 420 disposed in the HWF server 4 and the RIP engine 120 disposed in the DFE 100 employ the same RIP engine. In this disclosure, the same RIP engine means that the RIP engine has the same configuration at least for generating the raster data. Therefore, the RIP engine 420 and the RIP engine 120 may not employ the same configuration for every one of the processing units illustrated in FIGS. 9 and 10. Specifically, the RIP engine 420 and the RIP engine 120 employ the same configuration at least one or more units illustrated in FIGS. 9 and 10 used for generating the raster data.

A description is given of an operation of the HWF system 1000 of the embodiment with reference to FIG. 11. FIG. 11 is a sequential chart of an operation flow of the HWF system 1000. FIG. 11 is an example of a sequential chart when the digital printer 1 executes a print output operation. As illustrated in FIG. 11, the device information communication unit 415 of the HWF server 4 acquires device information from the DFE 100 and the CTP 200 via a network, and the device information manager 416 registers the device information in the device information storage 417 (S1101). The process of S1101 can be performed at regular intervals.

When a registration of job data is performed by an operation of an operator to a GUI of the HWF system 1000, the client terminal 5 transmits a job registration request to the HWF server 4 (S1102), in which the UI controller 412 of the HWF server 4 acquires the job registration request. With this configuration, the data receiver 411 acquires job data under the control of the system controller 410 (S1103).

When the data receiver 411 acquires the job data, the system controller 410 controls the job controller 413 to convert a format of the acquired job data to PDL format (S1104), and the format-converted job data is registered in the job data storage 414. As to the GUI that the registration of job data is performed at S1102, an interface such as a file path designating a registration target data, and an input section for designating each of image processing items in the JDF information (FIG. 3) can be displayed.

Further, by performing the process at step S1101, the HWF server 4 can acquire information of the type of the RIP engine 120 disposed in the DFE 100. Therefore, the information of the "RIP device designation" (FIG. 3) can be selectively input to an input section in the GUI of the client terminal 5, in which when the DFE 100 is to perform the processing, the RIP engine 120 to perform the concerned processing can be specifically selected.

Further, when a process of dividing the job data is performed in response to an operation of the operator to the GUI of the HWF system 1000, the client terminal 5 transmits a job dividing request to the HWF server 4 (S1105). FIG. 12 is an example of information included in the job dividing request transmitted at S1105. As illustrated in FIG. 12, information indicating a dividing target job and information indicating dividing contents are transmitted as the job dividing request. In this example case, the information indicating dividing contents is specifically correlated with a device to execute a print output operation of each of the dividing contents. In an example case of FIG. 12, one device is correlated for executing a print output operation of some pages, and another device is correlated for executing a print output operation of other pages, in which the devices are correlated with the unit of "page." The information indicated in FIG. 12 can be used as output destination designation information that designates different output destinations for different pages when the output target image includes a plurality of pages such as page data.

When the HWF server 4 receives the job dividing request, the system controller 410 divides the dividing target job (i.e., job data) page-by-page based on the information designating the dividing contents (FIG. 12) to generate a plurality of sub-job data configuring the dividing target job (S1106). In this process, the device designated for each of the divided portions can be used as information of "device designation" in the JDF information (FIG. 3). When the job data is divided to generate the plurality of the sub-job data, each of the sub-job data is stored in the job data storage 414 as a discrete job.

Further, when a process of generating a workflow is performed in response to an operation of the operator to the GUT of the HWF system 1000, the client terminal 5 transmits a workflow generation request to the HWF server 4 (S1107). When the workflow generation request is transmitted, information designating the workflow contents and information identifying one or more jobs to be processed in line with the workflow information (FIG. 5) are transmitted.

When the HWF server 4 receives the workflow generation request, the system controller 410 inputs the information received with the workflow generation request to the workflow controller 418. With this configuration, the workflow controller 418 generates a new workflow information based on the received information, and stores the new workflow information in the workflow information storage 419, and correlates the new workflow information and the job identified by the workflow generation request (S1108). The workflow and the job can be correlated by adding, for example, an identifier identifying the workflow to the JDF information.

When a job execution operation is performed on the client terminal 5 such as when the job execution operation is performed in response to an operation of an operator to the GUI on the client terminal 5 after S1108, the client terminal 5 transmits a job execution request to the HWF server 4 (S1109). Further, steps S1102 to S1109 can be performed as different processes, or steps S1102 to S1109 can be performed as one-time process that performs the job registration request, job dividing request, workflow generation request, and job execution request as one operation.

When the HWF server 4 receives the job execution request, the system controller 410 acquires the designated job data from the job data storage 414 based on information identifying the job data received with the job execution request (S1110). Further, the system controller 410 acquires the latest information of the device designated in the acquired job data from the device information manager 416, and sets the acquired latest information of the device to the job data (S1111).

Then, the system controller 410 transfers the job data to the workflow controller 418 to start an execution of the workflow (S1112). The workflow controller 418 acquires the workflow information correlated to the acquired job data from the workflow information storage 419, and executes the processes in line with the workflow information.

As to the workflow processing, the processing in the HWF server 4 to be performed by the RIP engine 420 disposed in the HWF server 4 is executed at first (S1113). At S1113, under the control of the workflow controller 418, the job controller 413 controls the RIP engine 420 to execute the processing as described above.

When the workflow processing proceeds to a stage to transfer the workflow processing to the DFE 100, under the control of the workflow controller 418, the job controller 413 controls the job communication unit 421 to transmit the job data to the DFE 100 (S1114). Therefore, the job controller 413 and the job communication unit 421 can be used as a transmission control unit that executes the transmission control of the job data to the DFE 100. At S1114, the job controller 413 designates one of the specific job receiving units 112 from the plurality of specific job receiving units 112 based on information designated in the JDF information.

When the job data is transmitted to the DFE 100, any one of the plurality of specific job receiving units 112 is designated, in which the specific job receiving unit 112 matched to the job data receives the job data in the DFE 100. When the job data is input into the DFE 100, as described above, the raster data is generated by the RIP engine 120 of the DFE 100, and then the output processing by the digital engine 150 is performed (S1115).

In the embodiment, the specific job receiving unit 112 to install a new JDF description conversion program 128 can be designated in the JDF information. Specifically, when the "device designation" in the JDF information illustrated in FIG. 3 is, for example, "install," it means the installment of the JDF description conversion program 128 to the DFE 100 is to be executed.

In this case, when job data is input to the DFE 100, the JDF description conversion program 128 is stored in the job data storage 114. The JDF description conversion program 128 is an instruction group including one or more instructions. Further, the JDF information can be described such that the storing of JDF description conversion program 128 and the processing for generating raster data are executed as a series of processing. In this case, when job data is input to the DFE 100, the JDF description conversion program 128 is stored in the job data storage 114, and then the processing for generating the raster data by the RIP engine 120 is executed.

When the DFE 100 completes the designated processes, the job receiver 111 reports the completion notice of the processes to the HWF server 4 (S1116). When the job controller 413 receives the completion notice of the processes from the DFE 100 via the job communication unit 421, the job controller 413 reports the completion notice of the processes to the workflow controller 418. Then, the workflow controller 418 transmits a post processing request to the post-processing apparatus 3 to execute a post-processing designated in the workflow executable after the processing at the DFE 100 (S1117).

At S1117, under the control of the workflow controller 418, the job controller 413 controls the job communication unit 421 to transmit the post processing request to the post-processing apparatus 3. By performing the above described processing, the operation of the HWF system 1000 completes.

A description is given of a detail of the internal processing in the DFE 100 at S1115 (FIG. 11) with reference to FIG. 13, which is a flowchart illustrating the steps of the processing in the DFE 100. As illustrated in FIG. 13, when the HWF server 4 transmits the job data to the DFE 100, the specific job receiving unit 112, designated for the job data, receives the job data (S1301). After receiving the job data, the specific job receiving unit 112 updates the JDF information to apply the specific setting, set to the specific job receiving unit 112, to the job data (S1302).

The job data received by the specific job receiving unit 112 is input to the system controller 113. The system controller 113 stores the input job data in the job data storage 114 based on the settings, and performs the preview processing or the like via the UI controller 115 in accordance with an operation by an operator.

When the execution time of the job at the DFE 100 has come such as when an operator operates the apparatus or the set execution time has come, the system controller 113 inputs the job data to the job controller 116. The job controller 116 inputs the job data to the JDF analyzer 117 to generate the job attribute in DFE (S1303).

Then, the job controller 116 generates RIP parameters, which are described with reference to FIG. 8 (S1304). Further, when the job controller 116 generates the RIP parameter (S1304), the job controller 116 inputs required information to the RIP unit 118 to execute the RIP processing. In this sequence, the RIP controller 119 performs the above described parameter conversion (S1305), and then the RIP controller 119 instructs the RIP engine 120 to execute the RIP processing by designating the converted parameters (S1306). With this configuration, the raster data can be generated by the RIP engine 120.

When the raster data is generated, and the job controller 116 acquires the raster data from the RIP unit 118, the job controller 116 inputs the raster data to the printer controller 123 to execute a print output operation by using the digital engine 150 (S1307). With this processing configuration, the internal processing in the DFE 100 is completed.

In the above described processing, an input device or apparatus that can transmit a print job to each of the plurality of specific job receiving units 112 can be respectively assigned or allocated in advance. In this case, the DFE 100 determines the specific job receiving unit 112 that the print job is to be input by referencing information of each device such as the HWF server 4 or the like.

Figure 14:
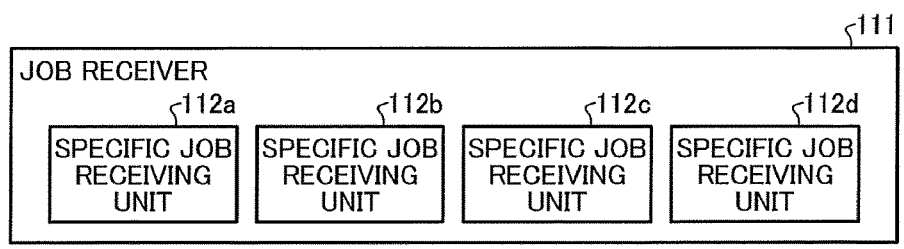
FIG. 14 illustrates an example of an internal configuration of a job receiver of an embodiment of the present invention.
Figure 15:
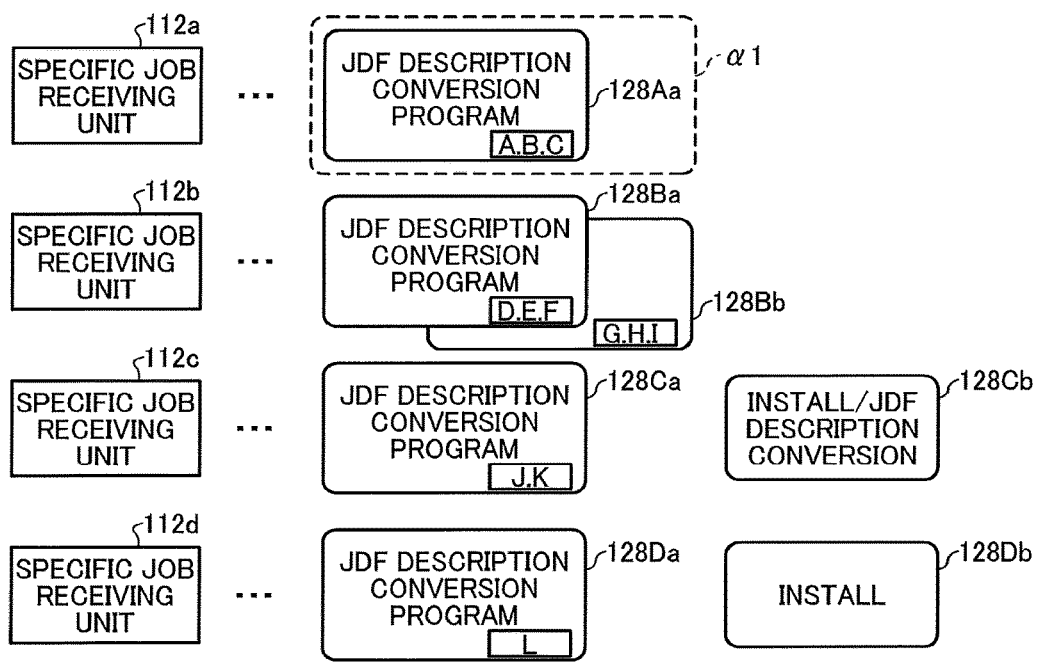
FIG. 15 illustrates an example of an assignment or allocation of JDF description conversion program in a specific job receiving unit of an embodiment of the present invention.

Further, in the embodiment, when the plurality of JDF description conversion programs 128 is stored in the job data storage 114, each of the plurality of JDF description conversion programs 128 can be respectively assigned or allocated to each of the plurality of specific job receiving units 112 in advance, with which the JDF description conversion program 128 to be executed by each of the specific job receiving units 112 can be set in advance. FIG. 14 illustrates an example of an internal configuration of the job receiver 111 of the embodiment, and FIG. 15 illustrates an example of an assignment or allocation of the JDF description conversion program 128 to the specific job receiving unit 112 of the embodiment, in which the JDF description conversion program 128 is installed in the specific job receiving unit 112.

As illustrated in FIG. 14, the job receiver 111 includes, for example, a plurality of the specific job receiving units 112 such as a specific job receiving unit 112a, a specific job receiving unit 112b, a specific job receiving unit 112c, and a specific job receiving unit 112d. Further, as illustrated in FIG. 15, each of the specific job receiving units 112 is assigned or allocated with settings defining which JDF description conversion program 128 is to be executed.

Hereinafter, it assumed that the specific job receiving unit 112a is assigned or allocated with settings used for executing a JDF description conversion program 128Aa including settings "A, B, C" used for converting the description of JDF information. Hereinafter, the specific job receiving unit 112a is described based on this assumption. In the embodiment, each of the settings "A, B, C" corresponds to description conversion setting information that correlates one format used for the description of JDF information before the conversion and another format used for the description of the JDF information after the conversion when converting or replacing the description of text included in the JDF information. Further, each of the settings "A, B, C" also indicates description conversion setting information that correlates one format used for the description of JDF information before the conversion and another format used for the description of the JDF information after the conversion when converting a description related to a data attribute hierarchy configuration described by the description rule of JDF information into a format processable or interpretable by the DFE 100.

Further, when the description format of JDF information used by each vendor is defined in advance, which means when information correlating the differences in the description formats of JDF information between the different vendors is available to public, the description conversion setting information defined for a specific vendor can be used. For example, in the embodiment, the settings "A, B, C" are set as description conversion setting information "al" defined for a vendor "a." In this case, when the JDF information related to the vendor "a" is used in the HWF system 1000, the description conversion setting information "al" is used in the HWF system 1000.

The specific job receiving unit 112*b* is assigned or allocated with settings used for executing a JDF description conversion program 128Ba including settings "D, E, F" as description conversion setting information, and a JDF description conversion program 128Bb including settings "G, H, I" as description conversion setting information.

The specific job receiving unit 112*c* is assigned or allocated with settings used for executing a JDF description conversion program 128Ca including settings "J, K" as description conversion setting information, and a JDF description conversion program 128Cb used for installing the JDF description conversion program 128Ca in the specific job receiving unit 112*c*.

The specific job receiving unit 112*d* is assigned or allocated with settings used for executing a JDF description conversion program 128Da including setting "L" as description conversion setting information, and a JDF description conversion program 128Db used for installing the JDF description conversion program 128Da in the specific job receiving unit 112*c*.

Figure 16:
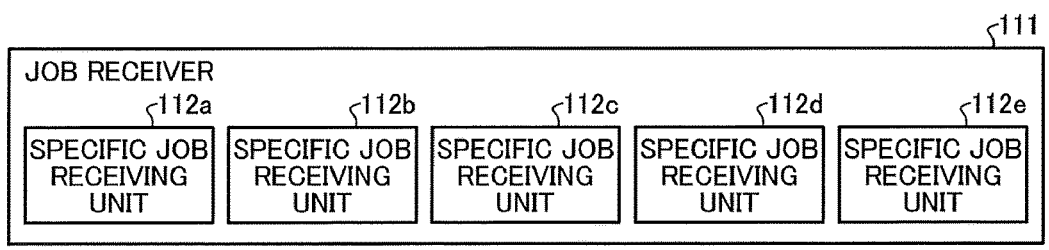
FIG. 16 illustrates another example of an internal configuration of a job receiver of an embodiment of the present invention.

Further, in the embodiment, as illustrated in FIG. 16, a specific job receiving unit 112*e* can be newly generated in the job receiver 111, and a JDF description conversion program 128Nn can be installed via the generated specific job receiving unit 112*e*. In this case, the HWF server 4 instructs the DFE 100 to generate the specific job receiving unit 112*e* newly, and inputs job data used for executing the installment of the JDF description conversion program 128Nn to the DFE 100 via the generated specific job receiving unit 112*e*.

Figure 17:
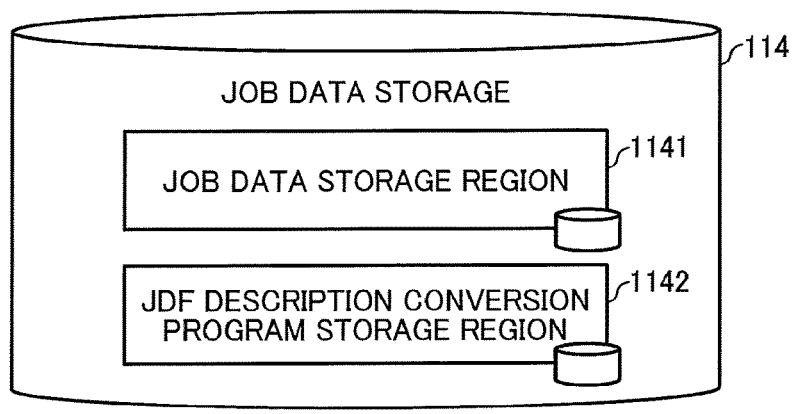
FIG. 17 illustrates an example of an internal configuration of a job data storage of an embodiment of the present invention.

Further, in the embodiment, the JDF description conversion programs 128Aa to 128Da can be stored in the job data storage 114 illustrated in FIG. 17. FIG. 17 illustrates an example of an internal configuration of the job data storage 114 of the embodiment. As illustrated in FIG. 17, the job data storage 114 includes, for example, a job data storage region 1141, and a JDF description conversion program storage region 1142. The job data storage 114 can be implemented by a memory.

The job data storage region 1141 is a storage region for storing job data received by the specific job receiving unit 112. The JDF description conversion program storage region 1142 is a storage region for storing the JDF description conversion programs 128Aa to 128Da. Further, when the JDF description conversion program 128Nn is installed newly, the JDF description conversion program 128Nn is stored in the JDF description conversion program storage region 1142.

Specifically, in the embodiment, when an operator of the HWF system 1000 designates any one of the specific job receiving units 112, and inputs job data to the DFE 100 from the HWF server 4, the JDF description conversion program 128Aa to 128Da already installed in the DFE 100 or the JDF description conversion program 128Nn newly installed in the DFE 100 can be executed.

Further, when the input job data includes information used for executing a print output operation by the DFE 100 when installing the new JDF description conversion program 128Nn, the JDF description conversion program 128Nn is installed in the DFE 100, and then the description of JDF information is converted.

Figure 18:
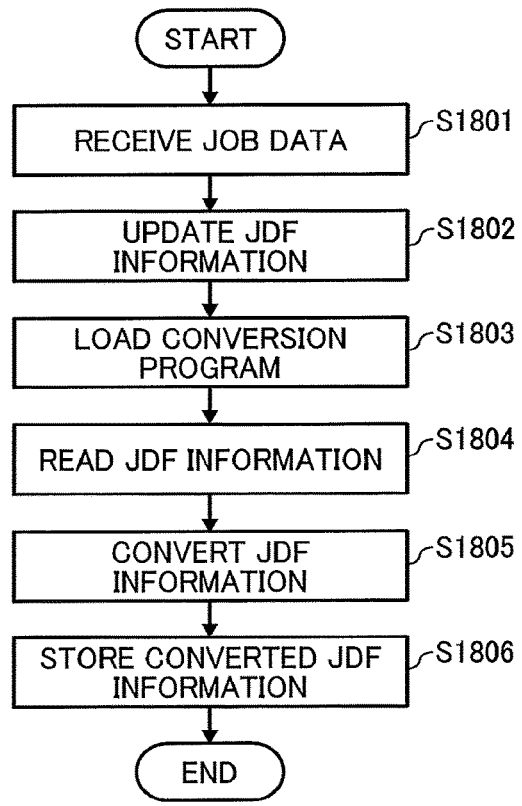
FIG. 18 is a flowchart illustrating the steps of process of converting description of JDF information of an embodiment of the present invention.

A description is given of a process of converting the description of JDF information in the embodiment with reference to FIG. 18. FIG. 18 is a flowchart illustrating the steps of process of converting the description of JDF information in the embodiment. Hereinafter, it is assumed that the specific job receiving unit 112*a* is designated at the HWF server 4, and then job data is input to the DFE 100 from the HWF server 4.

At first, when the HWF server 4 transmits the job data to the DFE 100 by designating the specific job receiving unit 112*a* in the job data, the designated specific job receiving unit 112*a* receives the job data (S1801).

When the specific job receiving unit 112*a* receives the job data, the specific job receiving unit 112*a* updates the JDF information so that the description conversion setting information set for the specific job receiving unit 112*a* in advance or the description conversion setting information "α1" is applied to the job data (S1802).

When the specific job receiving unit 112*a* receives the job data, the specific job receiving unit 112*a* inputs the job data to the system controller 113. Then, the system controller 113 stores the job data in the job data storage 114 or the system controller 113 inputs the job data to the job converter 126 depending on the settings.

When the system controller 113 inputs the job data to the job converter 126, the job converter 126 reads the JDF description conversion program 128 stored in the job data storage 114, and loads the JDF description conversion program 128 on a memory such as the RAM 20 based on the input job data (S1803). Therefore, the job data storage 114 can be used as a description conversion information storage.

Then, the job converter 126 reads JDF information included in the input job data (S1804), and executes the JDF description conversion program 128 on the read JDF information to convert the description of the JDF information included in the input job data (S1805). Therefore, the JDF description conversion program 128 executed at S1805 can be used as a description conversion unit for converting the process setting information.

The job converter 126 overwrites the JDF information included in the job data, stored in the job data storage 114, by applying the converted JDF information, and stores the converted JDF information in the job data storage 114 (S1806). Then, the job controller 116 executes the processing in accordance with the sequence from S1303 in the flowchart of FIG. 13 based on the converted JDF information.

By performing the above described processing in the embodiment, the job data including the JDF information not interpretable by the DFE 100 can be processed in the DFE 100. Further, when job data having a format that cannot be converted by the JDF description conversion programs 128Aa to 128Da already stored in the DFE 100 is input to the DFE 100, the new JDF description conversion program 128Nn can be installed to the DFE 100 from the HWF server 4, with which the DFE 100 can process the job data including the JDF information not interpretable by the DFE 100 already storing the JDF description conversion programs 128Aa to 128Da.

A description is given of examples of conversion patterns of the description of JDF information by the job converter 126 in the embodiment with reference to FIGS. 19 to 61.

FIG. 19 is an example of the JDF information included in job data input from the HWF server 4 to the DFE 100. As illustrated in FIG. 19, the JDF information includes, for example, JDF information of the pre-press processing, JDF information of the press processing, and JDF information of the post-press processing described in the JDF information of FIG. 3. Specifically, the pre-press processing is executed based on values set for the edit information, the layout information and the margin information illustrated in FIG. 3. The press processing is executed based on values set for the RIP status and the RIP device designation illustrated in FIG. 3. The post-press processing is executed based on values set for the finishing information illustrated in FIG. 3.

In this example case, it is assumed that the DFE 100 is designed to interpret the JDF information related to the press processing alone. In this example case, as illustrated in FIG. 20, the job converter 126 executes the JDF description conversion program 128 used for extracting the JDF information of the press processing executable by DFE 100 alone from the JDF information, and outputs the JDF information written with the description of the JDF information of the press processing alone.

That is, the job converter 126 executes the JDF description conversion program 128 to convert the JDF information included in the input job data to the JDF information including the description of JDF information executable in the DFE 100 alone or exclusively as illustrated in FIG. 21 so that the DFE 100 can execute the input job data. In this example case, the JDF information of the pre-press processing is processed by the HWF server 4, and the post-press processing is processed by the post-processing apparatus 3 based on the configuration of the HWF system 1000.

Figure 25:
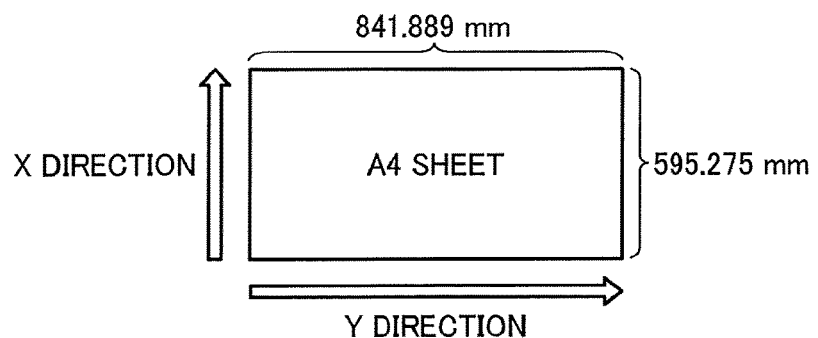
FIG. 25 illustrates an example of a print sheet having a given size of an embodiment of the present invention.
Figure 26:
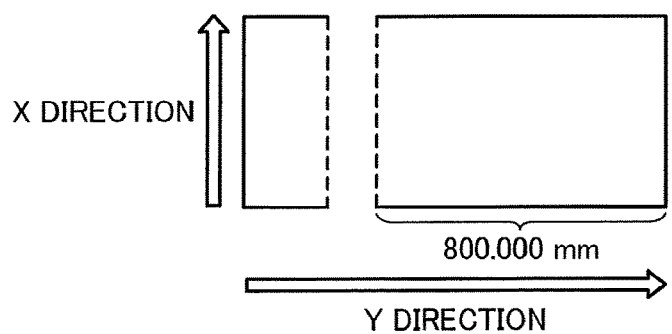
FIG. 26 illustrates an example of a print sheet having a reduced size after performing trimming of an embodiment of the present invention.

FIG. 22 is an example of JDF information included in job data input to the DFE 100 from the HWF server 4. The JDF information illustrated in FIG. 22 includes JDF information used for trimming a sheet such as A4 sheet illustrated in FIG. 25, in which the trimming is defined by a numerical value such as "800.000 (mm)" as illustrated in FIG. 26. The A4 sheet has a length of "841.889 (mm)" in the Y direction as illustrated in FIG. 25.

When the length of A4 sheet in the Y direction (FIG. 25) is to be reduced by performing the trimming, the length of the sheet in the Y direction after performing the trimming is required to be specified by a software used in the HWF server 4. In this example case, the length of the sheet in the Y direction after performing the trimming is specified or designated as "800.000 (mm)." Therefore, the length of the sheet in the Y direction after performing the trimming is required to be specified or designated as "800.000 (mm)" in the JDF information in the HWF server 4.

Figure 27:
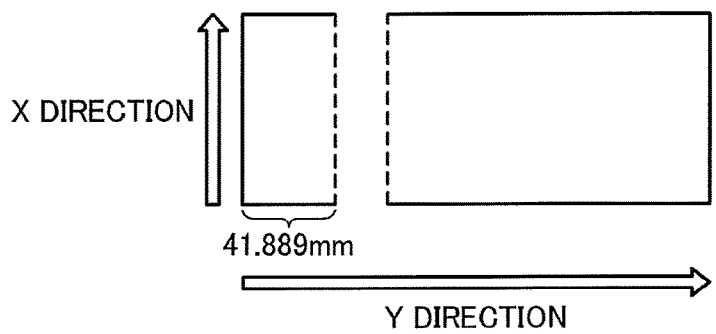
FIG. 27 illustrates an example of a size of trimming portion of a print sheet of an embodiment of the present invention.

By contrast, in this example case, it is assumed that the DFE 100 is designed to perform the trimming based on a length of a portion of the sheet to be removed by the trimming. Therefore, the length of the portion of the sheet to be removed by the trimming is required to be specified or designated in the DFE 100 as illustrated in FIG. 27. Specifically, the length of the portion of the sheet to be removed by the trimming is specified or designated as "41.889 (mm)" in the JDF information in the DFE 100 as illustrated in FIG. 27.

Therefore, in the embodiment, the job converter 126 executes the JDF description conversion program 128 used for converting a description of the JDF information related to the trimming of sheet. Specifically, the job converter 126 converts the length of the sheet in the Y direction after performing the trimming to the length of the portion of the sheet to be removed by the trimming as illustrated in FIG. 23. Then, the DFE 100 performs the print output operation based on the converted JDF information output from the job converter 126 so that a printed matter or product using the size-trimmed sheet is obtained.

As described above, when the JDF description conversion program 128 is executed by the job converter 126, the description related to the trimming included in the JDF information illustrated in FIG. 22 is converted from the length of the sheet in the Y direction after performing the trimming to the length of the sheet portion to be removed by the trimming as illustrated in FIG. 24.

FIG. 28 is another example of JDF information included in job data input to the DFE 100 from the HWF server 4. The JDF information illustrated in FIG. 28 includes JDF information to select A4 sheet automatically and to execute the print output operation using the selected A4 sheet.

In this example case, it is assumed that the DFE 100 is designed to select a sheet feed tray to designate a sheet used for the print output operation, and thereby the DFE 100 cannot process the JDF information of FIG. 28. Therefore, in the embodiment, the job converter 126 executes the JDF description conversion program 128 used for converting a description of the JDF information related to the sheet feed tray setting in the JDF information that is input to the DFE 100. Specifically, the job converter 126 converts the description of the JDF information related to the sheet feed tray setting in the JDF information input to the DFE 100 to a description of the JDF information processable by the DFE 100 as illustrated in FIG. 29.

When the JDF description conversion program 128 is executed by the job converter 126, the description related to the automatic selection of A4 sheet and executing the print output operation using the automatically selected A4 sheet is converted into a description designating a "tray 7" and executing the print output operation using a sheet in the "tray 7" as illustrated in FIG. 30.

FIG. 31 is another example of JDF information included in job data input to the DFE 100 from the HWF server 4. The JDF information illustrated in FIG. 31 includes JDF information setting a toner save mode for all of cyan, magenta, yellow, and black toners (C, M, Y, and K toners) by one setting element.

In this example case, it is assumed that the DFE 100 is designed to set the toner save mode for each of C, M, Y, and K toners one by one to control the print output operation based on the JDF information. Therefore, the DFE 100 cannot process the JDF information illustrated in FIG. 31.

Therefore, in the embodiment, the job converter 126 acquires the toner setting from the JDF information input to the DFE 100, and executes the JDF description conversion program 128 to convert the description of the JDF information related to the toner setting included in the input JDF information into a description of the JDF information setting the toner save mode for each one of C, M, Y, and K toners as illustrated in FIG. 32. When the JDF description conversion program 128 is executed by the job converter 126, the description of the JDF information related to the toner setting included in the input JDF information is converted into the description of the JDF information setting the toner save mode for each one of C, M, Y, and K toners as illustrated in FIG. 33.

As above described, the job converter 126 converts the description of the JDF information included in the input JDF information into the description of the JDF information interpretable by the DFE 100, in which the description of the JDF information included in the input JDF information is converted into the description of the JDF information interpretable by the DFE 100 by dividing or combining one or more values or character strings described by the JDF information included in the input JDF information, with which processing matched to a user intention can be performed without disposing a new processing module in the DFE 100.

FIG. 34 illustrates a scheme of executing a punching process and a stapling process to a printed matter or product such as a printed sheet. FIG. 35 is another example of JDF information included in job data input to the DFE 100 from the HWF server 4. The JDF information illustrated in FIG. 35 includes JDF information setting the punching process as a first process to be performed in a process sequence, and the stapling process as a second process to be performed in the process sequence after the first process.

In this example case, it is assumed that the DFE 100 is designed to execute the stapling process at first, and then the punching process, and thereby the DFE 100 cannot control the print output operation based on the JDF information of FIG. 35. Therefore, in order to execute the print output operation by using the DFE 100 based on the JDF information, the JDF information of FIG. 35 is required to be converted into the JDF information setting the stapling process as the first process, and the punching process as the second process to be performed after the first process in the process sequence.

Therefore, in the embodiment, the job converter 126 executes the JDF description conversion program 128 used for converting the description of the JDF information of FIG. 35 into the description of the JDF information setting the plurality of processes with a process sequence that can be executed in the DFE 100 as illustrated in FIG. 36. When the JDF description conversion program 128 is executed by the job converter 126, the description of the JDF information of FIG. 35 is converted into the description of the JDF information setting the stapling process as the first process, and the punching process as the second process as illustrated in FIG. 37.

FIG. 38 is another example of JDF information included in job data input to the DFE 100 from the HWF server 4. The JDF information illustrated in FIG. 38 includes JDF information setting a name of a sheet ejection tray as an element of a resource pool.

In this example case, it is assumed that the DFE 100 is designed to control the print output operation based on the JDF information when a name of a sheet ejection tray is set as an element of a sheet ejection location that is set at a hierarchy level lower than a hierarchy level of the element of the resource pool. Therefore, the DFE 100 cannot control the print output operation based on the JDF information of FIG. 38.

Therefore, in the embodiment, the job converter 126 executes the JDF description conversion program 128 to write a hierarchy level setting the name of the sheet ejection tray as the hierarchy level interpretable in the DFE 100 as illustrated in FIG. 39. When the JDF description conversion program 128 is executed by the job converter 126, the description of the JDF information of FIG. 38 is converted into the description of the JDF information setting the name of the sheet ejection tray as the element of the sheet ejection location set at the hierarchy level lower than the hierarchy level of the element of the resource pool as illustrated in FIG. 40.

As above described, the job converter 126 converts the description of the JDF information included in the input job data into the description of the JDF information interpretable by the DFE 100. Specifically, one or more values or one or more character strings, set as parameters in the description of process setting information included in the job data input from the HWF server 4, are converted into one or more values or one or more character strings interpretable by the DFE 100, with which processing matched to a user intention can be performed without disposing a new processing module in the DFE 100.

FIG. 41 is another example of JDF information included in job data input to the DFE 100 from the HWF server 4. The JDF information illustrated in FIG. 41 has no definition for the elements of the JDF.

In this example case, it is assumed that the DFE 100 is designed to control the print output operation based on the JDF information setting a JDF version definition for the elements of JDF. Therefore, the DFE 100 cannot process the JDF information of FIG. 41.

Therefore, in the embodiment, as illustrated in FIG. 42, the job converter 126 executes the JDF description conversion program 128 to convert the description of JDF information of FIG. 41 to the description of JDF information setting the JDF version definition when the JDF information input to the DFE 100 has no definition information of JDF version.

When the JDF description conversion program 128 is executed by the job converter 126, the description of the JDF information of FIG. 41 is converted into the description of the JDF information setting the JDF version definition as the JDF element as illustrated in FIG. 43, and then the JDF information setting the JDF version definition is output.

As above described, the job converter 126 converts the description of the JDF information of the job data input to the DFE 100 into the description of the JDF information setting the JDF version definition, with which the processing matched to the user intention can be performed without disposing a new processing module in the DFE 100.

FIG. 44 is another example of JDF information included in job data input to the DFE 100 from the HWF server 4. The JDF information illustrated in FIG. 44 includes JDF information used for executing the punching process for A3 sheet.

In this example case, it is assumed that the DFE 100 is designed not to execute the punching process for A3 sheet due to the design matter related to the digital engine 150 and the post-processing apparatus 3 used in the HWF system 1000. Therefore, the DFE 100 cannot control the print output operation based on the JDF information of FIG. 44.

Therefore, in the embodiment, as illustrated in FIG. 45, when a process that cannot be executed by the DFE 100 is designated in the JDF information input to the DFE 100, the job converter 126 executes the JDF description conversion program 128 to delete the description of JDF information related to the process that cannot be executed by the DFE 100.

When the JDF description conversion program 128 is executed by the job converter 126, the description of JDF information setting the punching process of the A3 sheet, which cannot be executed by the DFE 100, is converted into the JDF information deleting the punching process of A3 sheet as illustrated in FIG. 46.

As above described, when a combination of processes that cannot be executed by the DFE 100 is designated in the job data input to the DFE 100, the job converter 126 deletes the unexecutable combination of processes from the description of JDF information input to the DFE 100, with which the input job data can be executed without disposing a new processing module in the DFE 100.

FIG. 48 is another example of JDF information included in job data input to the DFE 100 from the HWF server 4. The JDF information illustrated in FIG. 48 includes information that specifies image information of a print target, in which a print target file stored in the storage region of the server 6 is specified or designated by a universal resource locator (URL) of "http://xx.xx.xx.xx:xxxx/PDF1.pdf."

In this example case, the DFE 100 attempts to access the server 6, which is a source of the print target file, to acquire the print target file designated by the URL included in the JDF information of FIG. 48. However, there is a case that an access right to the server 6 is not granted for the DFE 100. If the access right to the server 6 is not granted for the DFE 100, the DFE 100 cannot be connected to the server 6. Then, even if the DFE 100 attempts to execute the print output operation based on the JDF information illustrated in FIG. 48, the print target file cannot be acquired from the server 6.

Therefore, in the embodiment, even if the access right to an external device or apparatus such as the server 6 is not granted for the DFE 100, the job converter 126 executes the JDF description conversion program 128 used for converting the description of JDF information specifying the image information of the print target file so that the print target file included in the JDF information can be acquired by the DFE 100.

For example, as illustrated in FIG. 49, the JDF description conversion program 128 includes an access right to the server, URL of the print target file, and a password to enable the access to the server 6 as an access key to the server 6.

In this case, the job converter 126 executes the JDF description conversion program 128 to access the server 6, acquire the print target file from the designated URL, and output JDF information that is used for executing the print job. Therefore, an operator of HWF system 1000 does not see the password used for accessing the server 6, with which external leakage of the password can be prevented.

Further, even if the server 6 exists outside the LAN configuring the HWF system 1000, the DFE 100 can acquire the print target file from the server 6, and execute the print job.

Further, the JDF description conversion program 128 can be designed to temporarily grant the access right to the server 6 to enhance the information security. Further, the JDF description conversion program 128 can be described such that URL for acquiring the print target file changes from time to time to enable the random access to the print target file by using one-time URL.

When the JDF description conversion program 128 is executed by the job converter 126, the description of the URL designating a storage region in the server 6, which is the source of the print target file, is converted into a description designating the print target file name as illustrated in FIG. 50.

That is, the job converter 126 can acquire the print target file from the URL designated in the input job data, with which the processing matched to the user intention can be performed.

FIG. 51 is another example of JDF information included in job data input to the DFE 100 from the HWF server 4. The JDF information illustrated in FIG. 51 includes information of a character encoding of JDF information such as "Shift-JIS" used for drawing characters of "A RO HA."

In this example case, it is assumed that the DFE 100 is designed to use "UTF-8" as a character encoding, and thereby the DFE 100 cannot use or interpret the character encoding of "Shift-JIS." In this case, the DFE 100 cannot convert characters encoded by "Shift-JIS" included in the input JDF information, with which the characters "A RO HA" encoded by "Shift-JIS" are printed on a sheet as garbled characters.

Figures 52, 53, 54:
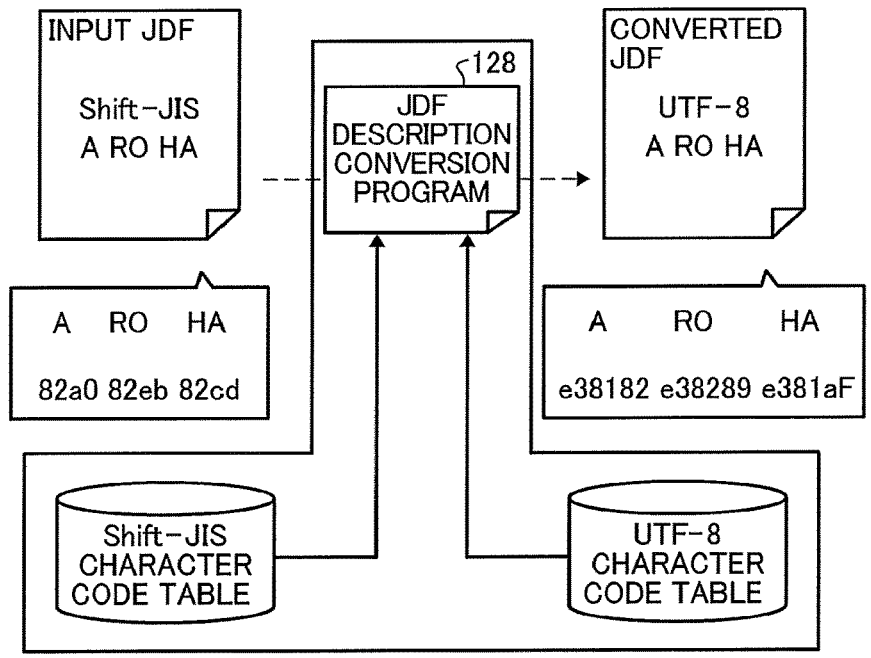
FIG. 52 illustrates a scheme of converting character encoding of an embodiment of the present invention.
FIG. 53 is another example of a configuration of a JDF description conversion program of an embodiment of the present invention.
FIG. 54 is another example of JDF information description after conversion of an embodiment of the present invention.

Therefore, in the embodiment, when the DFE 100 cannot use or interpret the character encoding used in the input JDF information, the job converter 126 executes the JDF description conversion program 128 used for converting a character code encoded by the character encoding used in the input JDF information to a character code encoded by a character encoding interpretable or processable by the DFE 100 as illustrated in FIG. 52 and FIG. 53.

In this example case, the JDF description conversion program 128 includes, for example, a character code table of the character encoding format "Shift-JIS" used in the JDF information input to the DFE 100 and a character code table of the character encoding format "UTF-8" interpretable by the DFE 100.

As illustrated in FIG. 52, when the job converter 126 executes the JDF description conversion program 128, a character code for drawing the characters of "A RO HA" described in "Shift-JIS" in the JDF information input to the DFE 100 is converted into a character code for drawing the characters of "A RO HA" by using "UTF-8."

Further, since the number of combinations of the character code interpretable by the HWF server 4 and the character code interpretable by the DFE 100 can be two or more combinations, the JDF description conversion program 128 is created for each one of the combinations.

When the job converter 126 executes the JDF description conversion program 128 on the JDF information input to the DFE100, the input JDF information is converted into the JDF information including the character code encoded by"UTF-8" that is interpretable or processable by the DFE 100 as illustrated in FIG. 54.

That is, the job converter 126 converts the character code in the JDF information described by various character encoding into the character code of the character encoding format interpretable by the DFE 100, with which the print output operation can be executed while preventing garbled characters or the like.

FIG. 55 illustrates an example of attribute information indicating various attribute set for a sheet used as a print target medium (i.e., recording medium) by the DFE 100 when the print output operation is to be executed. For example, as illustrated in FIG. 55, it is assumed that catalog information can be set for each of "Paper 1" and "Paper 2" at the DFE 100 as the information setting a sheet used for the print output operation, in which the catalog information includes a combination of information items.

In the embodiment, the catalog information is a combination of various attribute information of sheet, and the catalog information is used for managing the attribute information of sheet collectively. For example, "Paper 1" is used as one sheet catalog information that sets a plurality of attribute information of a sheet such as "size: A4," "sheet type: plain paper," "basis weight: 80 g/m$^2$," and "color: white." Further, "Paper 2" is used as another sheet catalog information that sets a plurality of attribute information of a sheet such as "size: A4," "sheet type: glossy paper," "basis weight: 100 g/m²," and "color: white." Further, the catalog information is designated by the catalog ID of the job information included in the JDF information illustrated in FIG. 3.

FIG. 56 is another example of JDF information included in job data input to the DFE 100 from the HWF server 4. The JDF information illustrated in FIG. 56 describes the attribute information of "size: A4" and "basis weight: 80 g/m²" set for a sheet used for the print output operation.

In this example case, it is assumed that the DFE 100 is designed to use the catalog information to determine a sheet used for the print output operation. Therefore, the DFE 100 cannot execute the print output operation by using the sheet defined by the JDF information of FIG. 56.

Therefore, in the embodiment, the JDF description conversion program 128 illustrated in FIG. 57 is executed. When the JDF description conversion program 128 illustrated in FIG. 57 is executed, attribute information of the sheet to be used for the print output operation is acquired from a portion in the input JDF information describing the sheet to be used for the print output operation, and then the input JDF information is converted into JDF information describing the catalog information of a sheet that satisfies the condition of the acquired attribute information of the sheet to be used for the print output operation.

When the JDF description conversion program 128 is executed by the job converter 126 on the JDF information input to the DFE 100, the input JDF information setting the attribute information of the sheet to be used for the print output operation is converted into JDF information setting the information of the sheet to be used for the print output operation by using the catalog information as illustrated in FIG. 58, and the converted JDF information is output.

That is, the job converter 126 converts the attribute information setting the attribute of the sheet used for the print output operation into the catalog information setting the sheet used as the print target medium, with which the print output operation can be executed while preventing the occurrence of untended images such as garbled characters or the like.

Further, the job converter 126 can be configured to execute the JDF description conversion program 128 to convert JDF information including the catalog information setting the sheet to be used for the print output operation into JDF information including attribute information used for setting the sheet.

Further, if the attribute information included in the input JDF information does not match "Paper N" defined by the catalog information completely, and thereby the paper that completely matches the attribute information cannot be set at the DFE 100, the JDF description conversion program 128 can be configured to compare elements of the attribute information included in the input JDF information and elements of the attribute information included the catalog information to select one catalog information having the greatest number of matched-elements to set a paper, and to execute a sample printing using the selected paper. In this case, the JDF description conversion program 128 can be executed to select the catalog information having the element of sheet size attribute information that matches the sheet size attribute information designating a sheet used for the print output operation in the input JDF information, and then the sample printing using the selected sheet can be executed.

FIG. 59 is another example of JDF information included in the job data input to the DFE 100 from the HWF server 4. The JDF information illustrated in FIG. 59 describes user or client information such as privacy information. In this case, when a print job is executed using the job data by the DFE 100, the client information may be remained as illustrated in FIG. 59.

For example, when an operation-related failure such as interruption of a print job occurs while executing the print job, the JDF information is used to perform a failure analysis, in which the failure analysis is performed using the JDF information by erasing the client information from the viewpoint of protection of personal information or privacy information.

Therefore, in the embodiment, as illustrated in FIG. 60, when the client information is included in the JDF information input to the DFE100, the job converter 126 executes the JDF description conversion program 128 to convert the description indicating the client information to a meaningless character string such as "xxxx . . . "

When the job converter 126 executes the JDF description conversion program 128 on the JDF information input to the DFE 100, the JDF information converting the description indicating the client information into "xxxx . . . " is output as illustrated in FIG. 61.

That is, the job converter 126 can prevent the leak of client information described in the JDF information outside the HWF system 1000 when executing the print output operation.

Further, coded graphic information such as a two-dimensional bar code and client information can be described in a predetermined region of image information used as a print target. In this case, the JDF description conversion program 128 can be configured such that an area of the two dimensional bar code or an area of the client information is not printed on a sheet, or the area of the two dimensional bar code or the area of the user information is painted as a solid black area when a print job is executed.

Then, the job controller 116 instructs the RIP unit 118 to execute the RIP processing based on the job data including the description of the JDF information converted by the job converter 126.

Figure 47:
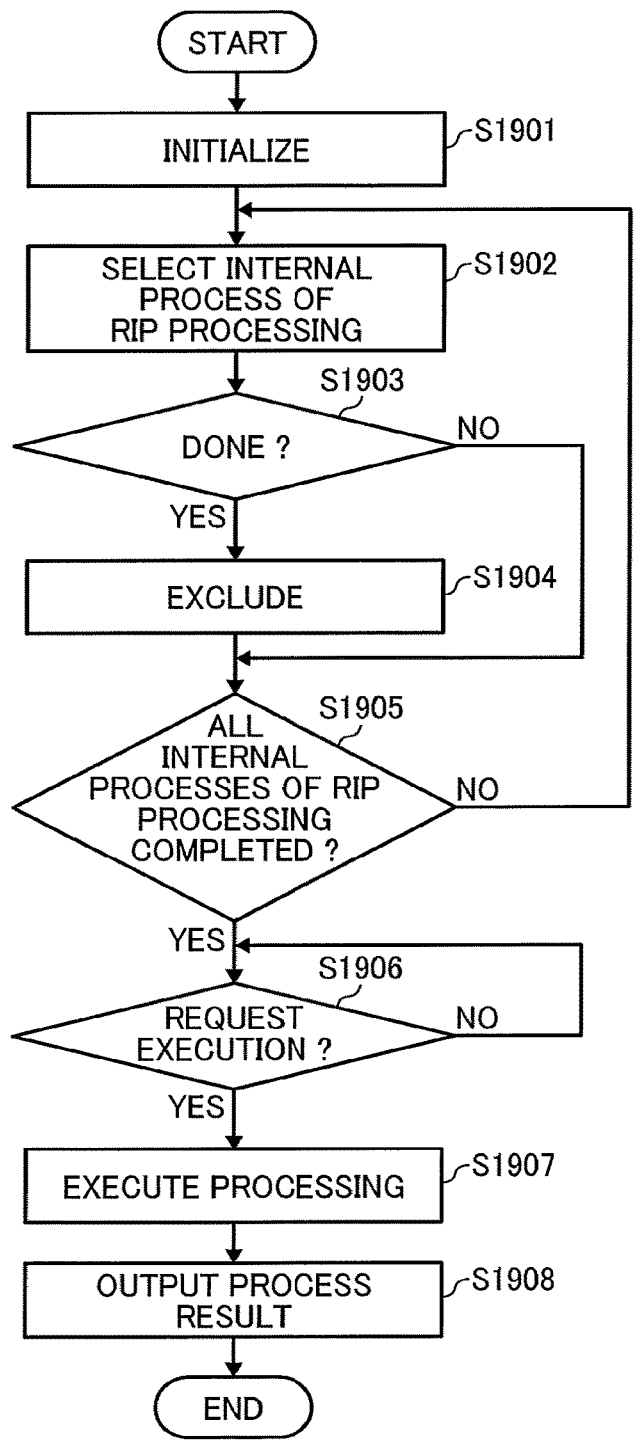
FIG. 47 is a flowchart illustrating the steps of processing in a DFE of an embodiment of the present invention.

Hereinafter, a description is given of the RIP processing at S1306 of FIG. 13 with reference to FIG. 47. As illustrated in FIG. 47, based on the initialization request input to the input unit 202, the control unit 201 performs an initialization process (S1901).

In an example case of FIG. 9, at S1901, the RIP parameter analyzer 203 receives and analyzes the RIP parameter to determine one or more extended units to be used for executing one or more processes among the extended units included in the RIP engine 120, and a process sequence of processing by the extended units as described above. Further, the RIP parameter analyzer 203 determines a data format of data to be generated as a process result when the processing is performed.

Further, in another example case of FIG. 10, at S1901, the job attribute analyzer 214 receives and analyzes JDF information and PDL information to determine one or more extended units to be used for executing one or more processes among the extended units included in the RIP engine 120, and a process sequence of processing by the extended units. Further, the job attribute analyzer 214 determines a data format of data to be generated as a process result when the processing is performed. Then, in another example case of FIG. 10, the control unit 201 instructs the RIP status analyzer 215 to execute the status analysis.

As to the RIP status analysis, the RIP status analyzer 215 refers or checks the "RIP status" (FIG. 3), and selects one image processing item of the internal processes of RIP processing (S1902). If the status of the selected image processing item is "Done" (S1903: YES), the corresponding extended unit is excluded from the extended units determined as the execution target at S1901 (S1904). If the status of the selected image processing item is "NotYet" (S1903: NO), the sequence proceeds to S1905.

The RIP status analyzer 215 repeats steps from S1902 to S1905 until all of the image processing items of the internal processes of RIP processing is processed (S1905: NO). When the RIP status analyzer 215 completes steps from S1902 to S1905 for all of the image processing items of the internal processes of RIP processing (S1905: YES), and the input unit 202 acquires an execution request of the RIP processing (S1906: YES), the control unit 201 controls each of the extended units to execute the RIP processing with a given process sequence (S1907).

At S1907, the RIP processing is requested to one or more extended units determined at step S1901 and not excluded by the process at step S1904. Further, the RIP processing is requested to be performed in line with the process sequence determined at step S1901. When the one or more extended units perform the RLP processing and the raster data is generated, the output unit 213 outputs the raster data as a process result (S1908). With this configuration, the RIP processing by the RIP unit 118 completes.

Further, in the above embodiment, the description is made only for the RIP engine 120 illustrated in FIG. 10. This is because when distributing or sharing the RIP processing in the HWF server 4 and the DFE 100, it is required to perform the status analysis. Specifically, when the RIP processing is divided and assigned or distributed to each of the HWF server 4 and the DFE 100, the RIP processing already executed at the HWF server 4 is required to be excluded from the RIP processing to be executed at the DFE 100.

Therefore, when the RIP processing is divided and assigned or distributed to each of the HWF server 4 and the DFE 100, the JDF analysis can be performed by the JDF analyzer 117, and then the status analysis can be performed by the RIP status analyzer 215 in the DFE 100 to determine which internal process of RIP processing is required to be processed at the DFE 100.

As to the above described embodiments of the present invention, a print job not compatible with the print controller or print controller apparatus can be executed, and a desired print output operation result can be obtained.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of present disclosure and appended claims.

What is claimed is:

1. An image data processing controller communicable with a server for controlling a plurality of processes, the image data processing controller comprising:
   circuitry to
      receive, from the server, (1) output target image information, and (2) command information including a description of process setting information in a first format defining a plurality of items to generate and output an image for printing;
      set description conversion setting information to one or more specific job receiving units implemented in the circuitry, each of the specific job receiving units of the one or more specific job receiving units set with the corresponding description conversion setting information;
      convert, when the description of the process setting information in the first format is not interpretable by the circuitry, the description of the process setting information in the first format into the description of the process setting information in a second format that is interpretable by the circuitry, by referencing the set description conversion setting information; and
      generate image drawing information to be used by an image generator, based on the output target image information and the command information, including the description of the process setting information in at least one of the first format and the second format.

2. The image data processing controller of claim 1, further comprising:
   a memory to store one or more instruction groups, each instruction group of the one or more instruction groups including one or more instructions to convert the description of the process setting information in the first format into the description of the process setting information in the second format,
   wherein the circuitry is further configured to specify one instruction group from the one or more instruction groups stored in the memory by referencing the set description conversion setting information, and execute the specified one instruction group to convert the description of the process setting information in the first format into the description of the process setting information in the second format.

3. The image data processing controller of claim 2,
   wherein when the circuitry executes the specified one instruction group to convert the description of the process setting information in the first format not interpretable by the circuitry into the description of the process setting information in the second format interpretable by the circuitry, the circuitry is further configured to extract one or more items, set in the description of the process setting information in the first format received from the server and exclusively executable by the circuitry to process the extracted one or more items by the circuitry.

4. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert one or more values or one or more character strings, set as parameters in the description of the process setting information received from the server, into one or more values or one or more character strings interpretable by the circuitry.

5. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to divide or combine one or more values or one or more character strings, set as parameters in the process setting information received from the server, to generate one or more values or one or more character strings interpretable by the circuitry.

6. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert one version information, set in the process setting information received from the server, into another version information interpretable by the circuitry.

7. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert a combination of processes, set in the process setting information received from the server and not executable by the circuitry, into one or more processes interpretable by the circuitry.

8. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert location information identifying a source of the output target image information, included in the command information received from the server, into information identifying a name of the output target image information, stored in the source, interpretable by the circuitry.

9. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert a first character code, set in the description of process setting information received from the server, into a second character code interpretable by the circuitry.

10. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert catalog information defining a recording medium to be used for forming the image by using the image generator, set in the process setting information received from the server, into attribute information defining the recording medium, interpretable by the circuitry.

11. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert attribute information defining a recording medium to be used for forming the image by using the image generator, set in the process setting information received from the server, into catalog information defining the recording medium, interpretable by the circuitry.

12. The image data processing controller of claim 2, wherein when the circuitry executes the specified one instruction group to convert the description of the process setting information in the first format not interpretable by the circuitry into the description of the process setting information in the second format interpretable by the circuitry, the circuitry is further configured to convert user information, set in the description of the process setting information received from the server, into another information interpretable and processable only inside the image data processing controller to prevent outputting the user information outside the image data processing controller.

13. The image data processing controller of claim 1, wherein the circuitry is further configured to execute the specified one instruction group by referencing the set description conversion setting information to convert the description of the process setting information in the first format not interpretable by the circuitry into the description of the process setting information in the second format interpretable by the circuitry.

14. The image data processing controller of claim 1, wherein the circuitry is further configured to generate the image drawing information to be used by the image generator based on the output target image information, and the command information including the description of the process setting information in the first format alone when the description of the process setting information in the first format is entirely interpretable by the circuitry without conversion, wherein the circuitry is further configured to generate the image drawing information to be used by the image generator based on the output target image information, and the command information including the description of the process setting information in the second format alone when the description of the process setting information in the first format is not entirely interpretable by the circuitry, and wherein the circuitry is further configured to generate the image drawing information to be used by the image generator based on the output target image information, and the command information including the description of the process setting information in the first format and the description of the process setting information in the second format when the description of the process setting information in the first format is partially interpretable by the circuitry.

15. A method of controlling an image data processing controller including circuitry and communicable with a server for controlling a plurality of processes, the method comprising:

receiving, from the server, (1) output target image information, and (2) command information including a description of process setting information in a first format defining a plurality of items to generate and output an image for printing;

setting, by the circuitry, description conversion setting information to one or more specific job receiving units implemented in the image data processing controller, each of the specific job receiving units of the one or more specific job receiving units, set with the corresponding description conversion setting information;

converting, when the description of the process setting information in the first format is not interpretable by the circuitry, the description of the process setting information in the first format into the description of the process setting information in a second format that is interpretable by the circuitry, by referencing the set description conversion setting information; and generating image drawing information to be used by an image generator, based on the output target image information and the command information including the description of the process setting information in at least one of the first format and the second format.

16. A non-transitory storage medium storing one or more instructions that, when executed by circuitry, cause the circuitry to execute a method of controlling an image data processing controller communicable with a server for controlling a plurality of processes, the method comprising:

receiving, from the server, (1) output target image information, and (2) command information including a description of process setting information in a first format defining a plurality of items to generate and output an image for printing;

setting, by the circuitry, description conversion setting information to one or more specific job receiving units implemented in the image data processing controller, each of the specific job receiving units of the one or more specific job receiving units, set with the corresponding description conversion setting information;

converting, when the description of the process setting information in the first format is not interpretable by the circuitry, the description of the process setting information in the first format into the description of the process setting information in a second format that is interpretable by the circuitry, by referencing the set description conversion setting information; and generating image drawing information to be used by an image generator, based on the output target image information and the command information including the description of the process setting information in at least one of the first format and the second format.

* * * * *